US011606693B2

(12) United States Patent
Bergquist et al.

(10) Patent No.: US 11,606,693 B2
(45) Date of Patent: Mar. 14, 2023

(54) APPLICATION OF INTEGRITY PROTECTION IN A WIRELESS COMMUNICATION NETWORK

(71) Applicant: Telefonaktiebolaget LM Ericsson (publ), Stockholm (SE)

(72) Inventors: Gunnar Bergquist, Kista (SE); Prajwol Kumar Nakarmi, Sollentuna (SE); Fredrik Sonnevi, Hägersten (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/734,597

(22) PCT Filed: May 17, 2019

(86) PCT No.: PCT/EP2019/062832
§ 371 (c)(1),
(2) Date: Dec. 3, 2020

(87) PCT Pub. No.: WO2019/233740
PCT Pub. Date: Dec. 12, 2019

(65) Prior Publication Data
US 2021/0235271 A1   Jul. 29, 2021

Related U.S. Application Data

(60) Provisional application No. 62/682,282, filed on Jun. 8, 2018.

(51) Int. Cl.
*H04W 12/106* (2021.01)
*H04W 12/088* (2021.01)
*H04L 9/40* (2022.01)

(52) U.S. Cl.
CPC ......... *H04W 12/106* (2021.01); *H04L 63/205* (2013.01); *H04W 12/088* (2021.01)

(58) Field of Classification Search
CPC ... H04W 72/042; H04W 76/15; H04W 76/27; H04W 72/0406; H04W 72/0413;
(Continued)

(56) References Cited

U.S. PATENT DOCUMENTS 7,043,677 B1 *  5/2006  Li ........................ H04L 1/0057
                                                               714/776
2007/0155339 A1   7/2007  Jiang
(Continued)

FOREIGN PATENT DOCUMENTS

CA    3095656 A1 *  10/2019  ......... G06F 21/6209
EP    2523487 A1    11/2012
(Continued)

OTHER PUBLICATIONS

Guoyin Zhang, Liang Kou, Liguo Zhang, Chao Liu, Qingan Da, Jianguo Sun, "A New Digital Watermarking Method for Data Integrity Protection in the Perception Layer of IoT", Security and Communication Networks, vol. 2017, Article ID 3126010, 12 pages (Year: 2017).*
(Continued)

*Primary Examiner* — Jeffery L Williams
*Assistant Examiner* — Zhimei Zhu
(74) *Attorney, Agent, or Firm* — Christopher & Weisberg, P.A.

(57) ABSTRACT

A method in a first node of a wireless communications network comprises: inspecting a data packet or message to determine a characteristic of the data packet or message; and selectively activating integrity protection for onward transmission of the data packet or message to a second node of the wireless communications network based on the determined characteristic.

22 Claims, 20 Drawing Sheets

(58) Field of Classification Search
CPC ..... H04W 80/02; H04W 88/06; H04W 28/06; H04W 12/106; H04L 63/205
See application file for complete search history.

(56) References Cited

U.S. PATENT DOCUMENTS

| | | | |
|---|---|---|---|
| 2011/0188408 A1* | 8/2011 | Yi | H04W 28/06 370/254 |
| 2018/0270668 A1* | 9/2018 | Nair | H04W 76/10 |
| 2019/0246282 A1* | 8/2019 | Li | H04W 80/10 |
| 2019/0392060 A1* | 12/2019 | Meiri | G06F 11/0751 |
| 2020/0037165 A1* | 1/2020 | Kunz | H04W 12/106 |
| 2020/0137577 A1* | 4/2020 | Li | H04W 12/033 |
| 2020/0374691 A1* | 11/2020 | Li | H04W 12/10 |

FOREIGN PATENT DOCUMENTS

| | | | | |
|---|---|---|---|---|
| EP | 2523487 A1 | * | 11/2013 | ........... H04L 63/123 |
| WO | WO-2017076891 A | * | 5/2017 | ........... H04L 63/123 |
| WO | WO-2017136071 A1 | * | 8/2017 | ........... H04W 76/11 |

OTHER PUBLICATIONS

"3GPP TS 36.323 V14.5.0", 3rd Generation Partnership Project; Technical Specification Group Radio Access Network; Evolved Universal Terrestrial Radio Access (E-UTRA); Packet Data Convergence Protocol (PDCP) specification (Release 14), Dec. 2017, pp. 1-43.

"3GPP TS 38.323 V15.1.0", 3rd Generation Partnership Project; Technical Specification Group Radio Access Network; NR; Packet Data Convergence Protocol (PDCP) specification (Release 15), Mar. 2018, pp.

"3GPP TS 33.401 V15.3.0", 3rd Generation Partnership Project; Technical Specification Group Services and System Aspects; 3GPP System Architecture Evolution (SAE); Security architecture (Release 15), Mar. 2018, pp. 1-163.

"3GPP TS 33.501 V15.0.0", 3rd Generation Partnership Project; Technical Specification Group Services and System Aspects; Security architecture and procedures for 5G system (Release 15) (S3-182047), Mar. 2018, pp. 1-128.

* cited by examiner

APPLICATION OF INTEGRITY PROTECTION IN A WIRELESS COMMUNICATION NETWORK

TECHNICAL FIELD

Embodiments of the present disclosure relate to wireless communication, and particularly to methods, apparatus and systems for integrity protection in a wireless communication network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

3GPP has standardized functions with the purpose of protecting 3GPP domains against eaves-droppers and data manipulation by malicious intruders.

The Packet Data Convergence Protocol (PDCP) is specified by 3GPP TS 36.323 for LTE and 3GPP TS 38.323 for 5G NR. The PDCP is the ingress/egress protocol of Layer 2 (L2) which provides the data link layer stack for both control and user data transfer.

FIG. 1 shows a 3GPP data layer stack. Note that "MAC" in this figure refers to Medium Access Control. Other uses of that acronym in this document refer to Message Authentication Code.

The PDCP of LTE provides ciphering and integrity protection for control plane messages to the overlying Radio Resource Control (RRC) layer and Non-Access Stratum (NAS) layer. The same two functions also apply for the Integrated Access and Backhaul (IAB) where IP packets are sent between eNBs of type donor node and relay node (RN), and for Sidelink Radio Bearers (SLRB) carrying communication for proximity-based services. The PDCP provides ciphering but not integrity protection for user plane IP packets passed directly between eNB and UE.

The L2 as employed by 3GPP LTE was designed to be fast and have small overhead relative to the size of internet packets. In 5G NR, the bulk of L2 as employed by LTE is reused, with much emphasis put on being faster and more reliable at some small cost of increased overhead.

During the early days of LTE standardization, UE and network vendors argued against an increased overhead to the size of packets. However, due to the technical evolution this is no longer a sustainable argument against integrity protection of user plane packets. Operators have instead successfully argued that 5G NR and new releases of LTE must be deployed with an option to enable integrity protection for user plane connections. Their reasons are not only the emergence of new deployments such as IoT and application requirements such as ultra-reliable, low-latency communication (URLLC) which in themselves require increased reliability, but also the tremendous growth of interest and business for the eavesdropping and manipulation of the internet and mobile broadband content. What was once an obscure activity of malicious but rare intruders is now emerging as a business with large investments of its own.

As a result, release 15 of 3GPP TS 33.501 for 5G NR security requirements does not (as in LTE) make a large distinction between user plane and control plane communication but essentially mandates that UE and network vendors must prepare for integrity protection by PDCP for both.

Release 15 of 3GPP TS 33.401 for 4G security requirements (e.g., LTE) makes an exception for user data communication with UEs, but there are ongoing discussions to remove that exception in future releases and, similar to NR, remove the distinction between control data and user data.

There currently exist certain challenge(s).

Integrity protection of mobile baseband packets does not come for free. It is a computationally complex exercise and consumes a large portion of processing cycles. It is the sort of processing that should be planned in advance (i.e. at hardware development) and performed by non-programmable acceleration circuits to avoid a massive degradation of data throughput.

More powerful Application Specific Integrated Circuits (ASIC) may be required for UEs, beyond that for which current or currently planned variants have been dimensioned. A similar situation exists on the network side. The non-programmable accelerators which are planned to be used or already deployed in many nodes performing PDCP processing of user plane packets are not equipped to handle the required increase of processing cycles.

SUMMARY

Certain aspects of the present disclosure and their embodiments may provide solutions to these or other challenges.

One aspect of the disclosure provides a method in a first node of a wireless communications network. The method comprises: inspecting a data packet or message to determine a characteristic of the data packet or message; and selectively activating integrity protection for onward transmission of the data packet or message to a second node of the wireless communications network based on the determined characteristic.

Apparatus for performing the method is also provided. For example the first node may comprise a core network node, a radio access network node or a wireless device (e.g., a UE).

A further aspect of the disclosure provides a method in a third node of a wireless communications network. The method comprises: receiving, from a first node of the wireless communications network, a data packet or message for onward transmission to a second node of the wireless communications network, the data packet or message comprising an indication as to whether integrity protection should be applied for onward transmission to the second node; processing the data packet or message for transmission to the second node, including selectively applying integrity protection according to the indication; and transmitting the processed data packet or message to the second node.

Apparatus for performing this method is also provided. For example, the third node may comprise a radio-access network node.

In one embodiment, it is proposed to:
  activate/deactivate integrity protection per data radio bearer DRB, per signaling data radio bearer SRB or per data session (rather than to "per all bearers for UE of some certain type such as DRB"); and
  employ a method that inspects the content of each packet and ports/gates/routes/forwards/maps the sensitive data parts to a secondary/second flow of data packets while the other data parts remain as bulk data in a primary/first flow of data packets;
  map the primary/first flow of data to a first DRB and the secondary/second data flow to a second DRB; and
  employ integrity protection only to the packets in the second DRB.

There are, proposed herein, various embodiments which address one or more of the issues disclosed herein. Certain embodiments may provide one or more of the following technical advantage(s).

The proposed solution enables integrity protection of over-the-air data packet forwarding between UE and its serving base station node, such that the integrity protection is applied only to a smaller fraction of all packet data flows, thereby avoiding the severe data throughput degradation that will result from applying non-conditional integrity protection to all packet data flows.

The solution is much less costly on the network side as compared to full scale integrity protection of each and every packet over each and every data radio bearer over each and every product version exchanged with each and every UE, not only in terms of capacity of connected users and throughput per portion of processing capacity, but also in terms of ease and cost of development.

It furthermore provides a huge benefit for the operators to employ a solution that excludes the main body of mobile baseband content (such as video and music) which does not need integrity protection, and instead focus on the much smaller number of packets that need it, in a way that is friendly to the processing capacity of all types and form factors of UEs which connect to the network.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments of the present disclosure relate to the use of integrity protection for transmissions over an air interface in a wireless communications network. As used herein, and as would be familiar to those skilled in the art, in this context "integrity protection" describes the use of one or more algorithms or mechanisms to ensure the integrity of the sender-receiver transmission is protected, i.e. such that a receiver can authenticate that a received data packet or message was transmitted by a known sender and was not, for example, intercepted by a third party between the sender and the receiver or subject to third-party "man-in-the-middle" attack. Such integrity protection algorithms may involve the exchange of one or more secure keys between the sender and the receiver, and the use of those keys to encrypt the data packet or message, or to append a secure authentication code to the data packet or message. Both symmetric-key algorithms (in which a single key is used for encryption and decryption) and asymmetric-key algorithms (in which different keys are used for encryption and decryption, such as in public-private keys) are known. Current LTE standard utilize symmetric-key integrity protection, but asymmetric-key integrity protection may be used in future, and the present disclosure is not limited in this respect. Any suitable integrity protection mechanism is envisaged.

Figure 1:
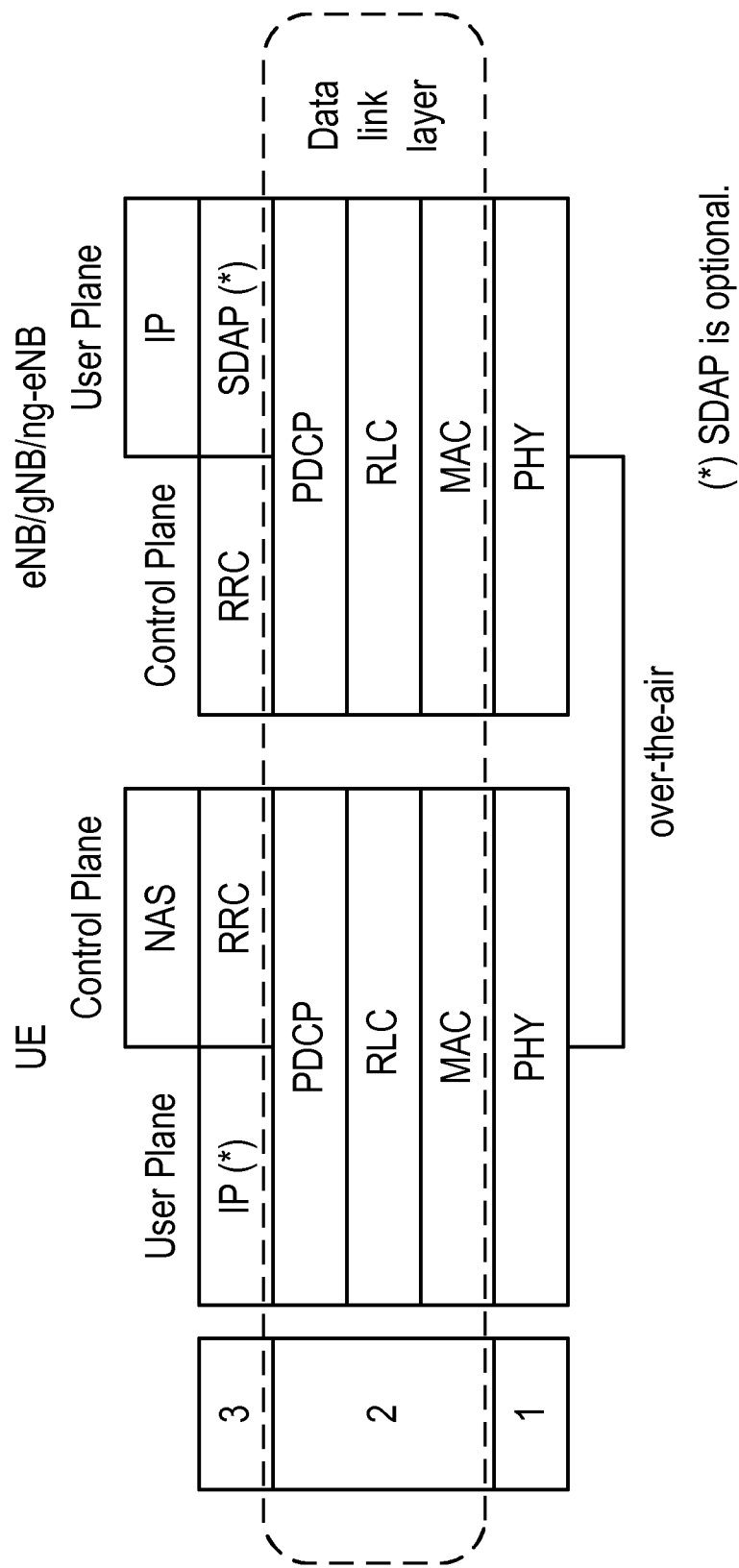
FIG. 1 shows a 3GPP data layer stack.
Figure 2:
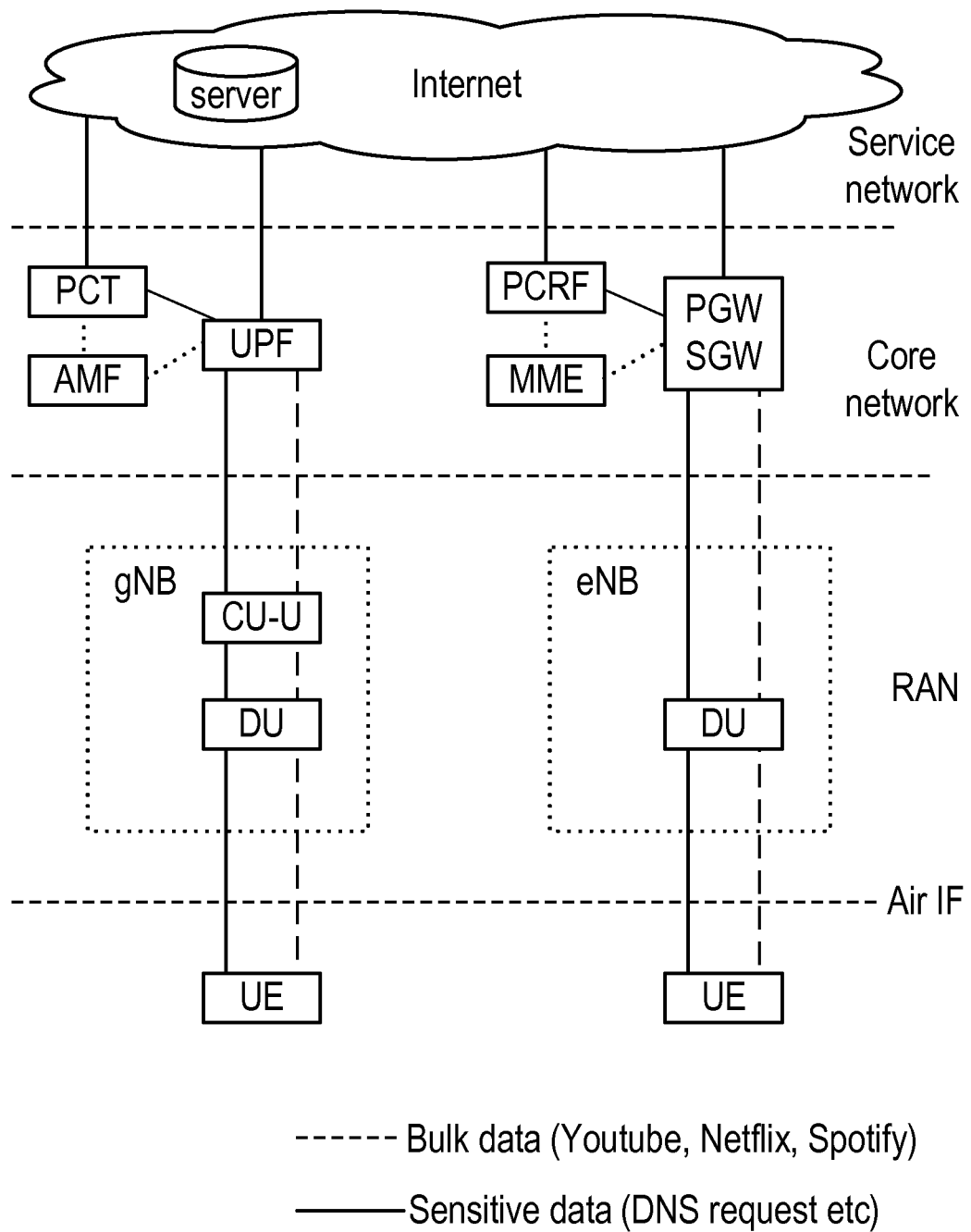
FIG. 2 shows a wireless communications network according to embodiments of the disclosure.

FIG. 2 illustrates two network topologies according to embodiments of the disclosure. The left-hand side of the drawing shows a 5G NR embodiment. The right-hand side of the drawing shows a 4G LTE embodiment. Both network topologies comprise a service network (such as the internet, or the Cloud), a core network, and a radio-access network (RAN) which provides service to one or more wireless devices or UEs over an air interface.

On the left-hand side of the drawing, a network topology is shown which may comply with the 5G NR standards.

According to this topology, in the core network, a user plane function (UPF) is coupled to a policy control function (PCF) and/or an access and mobility management function (AMF). The UPF is coupled to the RAN part of the network topology, which comprises one or more radio-access network nodes (also known as network nodes, base stations, gNodeBs, etc). In the illustrated embodiment, the gNB is logically partitioned into at least two parts: a central unit (CU) and a distributed unit (DU). The precise definition and function of these logical components is yet to be confirmed, but in general the CU performs higher-layer processing, while the DU performs lower-layer processing, to include at least transmission of data over the air interface. In the illustrated embodiment, which focusses on the processing and transmission of user plane data, the CU is further divided into parts for the user plane (CU-U) and the control plane (CU-C). Only the CU-U is illustrated; however, those skilled in the art will appreciate that embodiments of the disclosure are equally applicable to user plane and control plane data. Further, in other embodiments, the gNB may not be divided into multiple logical parts at all.

On the right-hand side of the drawing, a network topology is shown which may comply with the 4G LTE standards. According to this topology, in the core network, a policy and charging rules function (PCRF) and/or a mobility management entity (MME) are coupled to a packet data network gateway (PGW) and/or a serving gateway (SGW). The PGW is coupled to the service network, while the SGW is coupled to the RAN part of the network topology, which comprises one or more radio-access network nodes (also known as network nodes, base stations, eNodeBs, etc). In the illustrated embodiment, the eNB is logically partitioned into at least two parts: a digital unit (DU) and a radio unit (RU). DU performs higher-layer processing, while the RU performs lower-layer processing, including at least transmission of data over the air interface. In other embodiments, the eNB may not be divided into multiple logical parts at all.

Those skilled in the art will appreciate that, in both 4G and 5G embodiments above, various nodes and functions may have been omitted from FIG. 2 for the purposes of clarity. In particular, where an interface is shown coupling two nodes in FIG. 2, this interface may be direct (i.e. without further nodes in between) or indirect (i.e., with one or more nodes in between the two coupled nodes).

According to embodiments of the disclosure, data packets or messages which are intended for transmission to another node of the network (e.g., a UE in downlink, or a RAN node in uplink) are first inspected to determine a characteristic of the data packet or message. Based on that determined characteristic, integrity protection for the data packet or message is selectively activated for onward transmission to the node. In this way, the processing complexity associated with implementing integrity protection can be lessened, by selectively activating integrity protection for those data packets or messages which would benefit from it.

The mapping between the determined characteristic and the selective activation of integrity protection may be performed according to one or more functions. Such functions may provide that those data packets or messages which contain or are associated with user data which is more sensitive (e.g., user sensitive or confidential) are subject to integrity protection, while those data packets or messages which contain or are associated with user data which is less sensitive are not subject to integrity protection. For example, data packets containing personal, financial or other sensitive data may be subject to integrity protection, while data packets containing video streaming data may not.

The functions may further take into account user sensitivity to interception by third parties. For example, user data which is associated with certain services, such as those currently provided operated by Facebook® and YouTube®, is already subject to one or more security or encryption algorithms (e.g., application layer security). In this case, the data packet or message may not benefit from further integrity protection over-the-air, and thus the user may not be as sensitive to its interception by third parties. The functions may provide for such data packets or messages not being subject to (further) integrity protection.

The functions or rules may be received from another node of the network, such as the Policy Control Function (PCF) or the Policy and Charging Rules Function (PCRF).

Such a method may be employed in a variety of different nodes according to different embodiments of the disclosure. For example, in downlink communications, the method may be implemented in a core network node, such as the PGW or UPF described above. In such embodiments, the core network node may inspect the data packet or message to determine the characteristic, then forward the data packet or message for onward transmission to the wireless device with an instruction to utilize integrity protection for that transmission. For example, the data packet or message may be forwarded to a RAN node for transmission, and comprise an indication to use a data radio bearer (e.g., a DRB or SRB) for which integrity protection is configured. Alternatively, the method may be implemented directly in the RAN node, which inspects each received data packet or message to determine the characteristic and whether to use integrity protection.

In uplink communications, from a wireless device to a RAN node, the wireless device or UE may implement the method, inspecting each data packet or message to determine whether to use integrity protection for the over-the-air transmission.

A further aspect of the disclosure relates to the implementation of the integrity protection by a network node. This aspect may be particularly relevant in embodiments where the method above, relating to inspection of a data packet and selective activation of integrity protection, is carried out by a core network node. In the further aspect, a third node (e.g., a RAN node) receives a data packet or message from a first node (e.g. a core network node) for onward transmission to a second node (e.g., a wireless device or UE). The data packet or message comprises an indication as to whether integrity protection should be applied for onward transmission to the second node. The third node processes the data packet or message for wireless transmission to the second node, including selectively applying integrity protection according to the indication, and then transmits the processed data packet or message to the second node.

Further description of these and other aspects is provided below.

Figure 3:
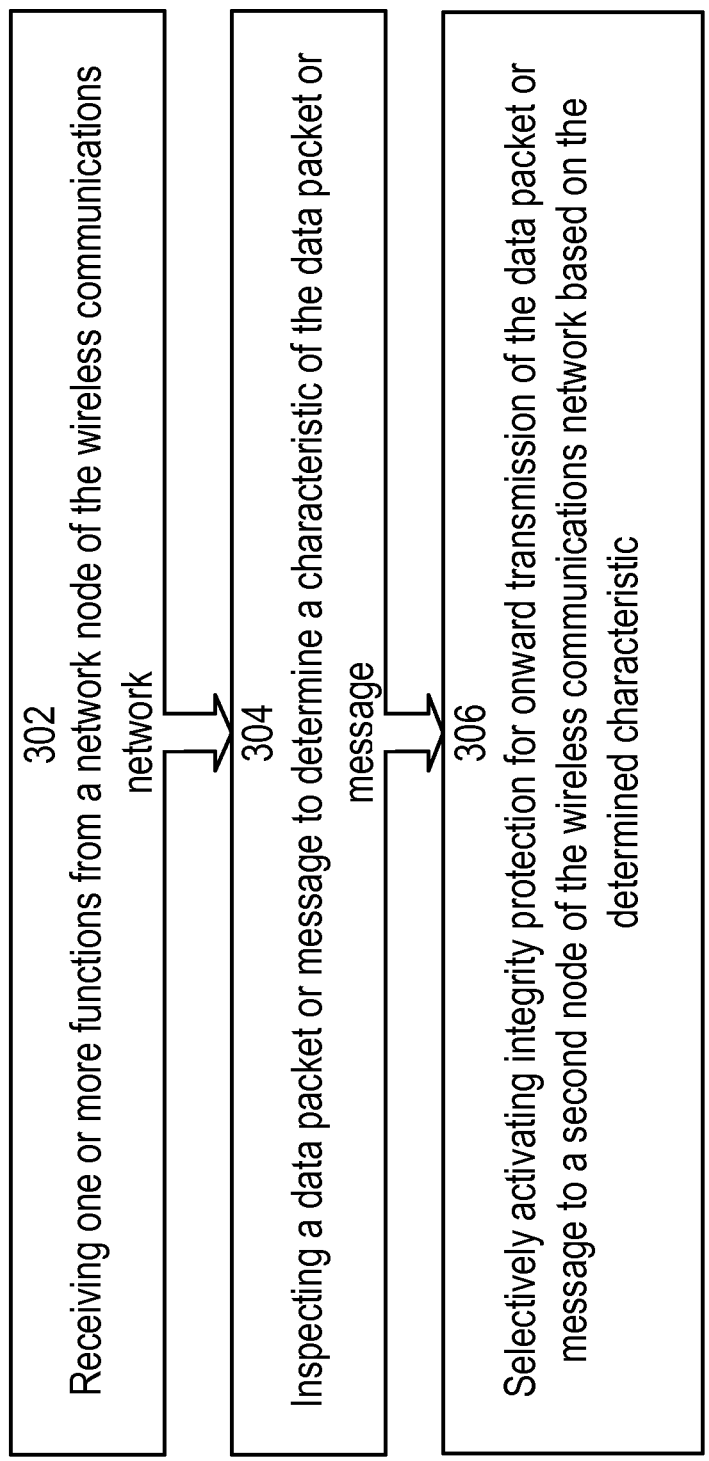
FIG. 3 is a flowchart of a method according to embodiments of the disclosure.

FIG. 3 depicts a method in accordance with particular embodiments. The method may be implemented in a node of a wireless communication network, such as a core network node (e.g., PGW/SGW, UPF, etc), a radio access network node (e.g., base station, eNB, gNB) or a wireless device (e.g., UE). For example, where the method relates to downlink communications, the method may be implemented in a core network node (such as the PGW/SGW or UPF described above with respect to FIG. 2) or a radio access network node (such as the eNB or gNB described above with respect to FIG. 2, or the network node 1360 described below with respect to FIG. 13). For example, where the method relates to uplink communications, the method may be implemented in a wireless device, terminal device or UE (such as the UEs described above with respect to FIG. 2, the wireless device 1310 described below with respect to FIG. 13, or the user equipment 1400 described below with respect to FIG. 14). In the following description, the method is performed in a "first node", which may be any of the nodes or devices described above. The data packet or message is intended for wireless transmission to a "second node", which may be a wireless device (or UE) for downlink communication or a radio access network node (or base station, etc) for uplink communication. Some embodiments comprise a "third node" which is an intervening node which actually performs the transmission to the second node over the air interface (e.g. a base station or other radio access network node).

In one embodiment, the method is implemented within the packet data convergence protocol (PDCP) layer.

The method begins in step 302, in which the first node receives one or more functions (or rules, profiles, or policies) from a network node of the wireless communications network. The functions relate to a mapping to be applied between a determined characteristic of data packet or message, and a selective activation of integrity protection for onward transmission of that data packet or message. Such functions may provide that those data packets or messages which contain or are associated with user data which is more sensitive (e.g., user sensitive or confidential) are subject to integrity protection, while those data packets or messages which contain or are associated with user data which is less sensitive are not subject to integrity protection. For example, data packets containing personal, financial or other sensitive data may be subject to integrity protection, while data packets containing video streaming data may not.

The functions may further take into account user sensitivity to interception by third parties. For example, user data which is associated with certain services, such as those currently provided operated by Facebook and YouTube, is already subject to one or more security or encryption algorithms (e.g., application layer security). In this case, the data packet or message may not benefit from further integrity protection over-the-air, and thus the user may not be as sensitive to its interception by third parties. The functions may provide for such data packets or messages not being subject to (further) integrity protection.

Further detail of these functions will be described below. The functions may be received from a core network node, such as a PCF or PCRF, for example.

Alternatively, or additionally, one or more such functions may be hard-coded within the first node (e.g. at the point of manufacture).

In step 304, the first node receives a data packet or message for onward transmission to a second node, and inspects the data packet or message to determine a characteristic of that data packet or message. The data packet or message may comprise user plane data or, in some embodiments, control plane data.

The determined characteristic may vary according to the functions received in step 302. For example, the characteristic may comprise one or more of: a destination or source address associated with the data packet (e.g. an IP address); the presence or absence of a cryptographic security protocol applied to the data contained within the packet (e.g., application layer security); the size of the data packet, etc.

In step 306, the first node selectively activates integrity protection for onward transmission of the data packet or message to the second node based on the determined characteristic. Optionally, such selective activation may be based on the one or more functions received in step 302.

For example, in one embodiment, a default function may be defined such that integrity protection is activated for the data packet or message by default, unless it is determined that the characteristic of the data packet or message meets one or more exception criteria. In such an embodiment, whenever the network and UE start to exchange a new flow and/or add a new bearer, integrity protection is applied to all corresponding data packets unless the exception criteria apply. The DEFAULT-ON policy may be applied preferentially at start-up of the network or addition of a new device or unit, motivated by the fact that it plays safe. At start up, units that perform integrity protection may not know if the underlying data traffic will benefit from integrity protection over-the-air. Therefore, the network plays it safe by starting with integrity protection. When the data traffic starts, the network determines or estimates the nature of the data traffic. If the network decides that underlying data traffic benefits from integrity protection over-the-air, the network may keep the current state. Otherwise, if the network determines that the underlying data traffic does not benefit from integrity protection over-the-air, the network may not utilize integrity protection. For example, a new flow/bearer without integrity protection may be established and utilized, or the current flow/bearer may be reconfigured to turn OFF the integrity protection.

In another (alternative) embodiment, a default position or function may be defined such that integrity protection is not activated for the data packet or message by default, unless it is determined that the characteristic of the data packet or message meets one or more exception criteria. In this embodiment, the network may start with non-integrity protected flows/bearers as DEFAULT, and then dynamically add integrity protected flows/bearers or modify existing flows/bearers to configure and activate integrity protection. In this DEFAULT-OFF embodiment, whenever the network creates a new flow/bearer, it starts that flow/bearer with integrity protection OFF. The reason is that the network may use an optimistic policy and assume that the underlying data traffic will not benefit from integrity protection over-the-air, e.g. the network may have good reason and input to predict that the user is going to use heavy video download. When the data traffic starts, the network then determines or estimates the nature of the data traffic. If the network decides that underlying data traffic actually benefits from integrity protection over-the-air, the network creates another flow/bearer with integrity protection ON and shifts the data traffic to that flow/bearer. Otherwise, if the network determines that the underlying data traffic does not benefit from integrity protection over-the-air, the network keeps the current state. The network could also dynamically modify the current flow/bearer to turn ON the integrity protection.

In a further additional or alternative embodiment, the characteristic of the data packet or message comprises a destination or source address associated with the data packet or message (e.g., an IP address). Such an address may be obtained from a header of the data packet or message (e.g., a TCP/UDP header). In this case, selectively activating integrity protection for onward transmission of the data packet or message comprises the one or more functions comprise a function activating integrity protection for onward transmission of the data packet or message responsive to a determination that the destination or source address is associated with one or more first services, and not activating integrity protection for onward transmission of the data packet or message responsive to a determination that the destination or source address is associated with one or more second services. For example, the first services may comprise critical IoT, infrastructure or financial institutions (e.g., banks, etc). The second services may comprise one or more of: all other services, services which already comprise some level of encryption or integrity protection such as YouTube®; services associated with transfer of bulk data (e.g., for non-sensitive video streaming, such as Netflix® or Amazon Prime®).

In a further additional or alternative embodiment, the characteristic of the data packet or message comprises the presence or absence of a cryptographic security protocol or other integrity protection applied to the data packet or message. For example, such presence or absence may be indicated by the port number of the data packet or message. If the port number indicates a protocol associated with integrity protection, such as HTTPS (e.g., port number 443), this is an indication that integrity protection is already applied through application layer security. Alternatively or additionally, a TLS security protocol handshake may be observed (e.g., between the first node and the node from which the data packet or message was sent). Again, this would indicate that integrity protection is already applied. In such embodiments, integrity protection may be activated for onward transmission of the data packet or message responsive to a determination that a cryptographic security protocol or integrity protection has not been applied to the data packet or message (e.g., is absent). Integrity protection may not be activated for onward transmission of the data packet or message responsive to a determination that a cryptographic security protocol has been applied to the data packet or message (e.g., is present).

In a further additional or alternative embodiment, the characteristic of the data packet or message comprises the size of the data packet or message. In such an embodiment, selectively activating integrity protection for onward transmission of the data packet or message comprises activating integrity protection for onward transmission of the data packet or message responsive to a determination that the size is less than one or more thresholds, and not activating integrity protection for onward transmission of the data packet or message responsive to a determination that the size is greater than one or more thresholds. In such embodiments, the large packet size may be an indication that the data relates to bulk data transfer (such as may be utilized in file download or streaming services). Integrity protection over-the-air may not be as critical for such data.

In a further additional or alternative embodiment, the characteristic comprises the data rate of the flow to which the data packet or message belongs. Responsive to a determination that the data rate is above one or more thresholds (e.g., load in the first node is relatively high), integrity protection may be deactivated in order to reduce load and other associated metrics such as latency. Responsive to a determination that the data rate is below one or more thresholds, (e.g., load in the first node is relatively low), integrity protection may be activated.

Thus the disclosure provides various functions or rules by which it is determined to apply integrity protection to a data packet or message, based on a characteristic of that data packet or message. Integrity protection may be selectively activated according to one or more of the embodiments set out below.

In one embodiment, a plurality of data radio bearers (DRBs) are established for wireless transmissions to the second node (e.g., between the first node and the second node, or between a third node and the second node). The plurality of DRBs comprise at least a first DRB for which integrity protection is configured, and a second DRB for which integrity protection is not configured. In some embodiments, the plurality of DRBs comprise additional DRBs for which alternative levels of security and/or integrity protection are configured. The present disclosure is not limited to two DRBs, or to binary ON/OFF integrity protection, but encompasses and contemplates multiple levels of integrity protection and encryption.

Further, although the discussion below focusses on user plane data and data radio bearers, embodiments of the disclosure are equally applicable to signalling radio bearers (SRBs) and to relay node data and signalling radio bearers (also known as sidelink radio bearers (SLRBs)). The person skilled in the art will appreciate that references to DRBs include and encompass SRBs and SLRBs herein.

In such embodiments, the integrity protection may be selectively activated by steering the data packet or message to one of the plurality of DRBs based on the characteristic determined in step 304. For example, where the first node is a radio access node or a wireless device, the first node may process the data packet or message and transmit it on the selected DRB, using the integrity protection which is configured (or not) for that DRB. For example, a message authentication code (MAC-I) associated with integrity protection may be calculated, and added to the data packet or message. Additionally or alternatively, a flow indicator may be added to the data packet or message (e.g., in a header, such as a SDAP header), taking one of at least two values respectively associated with integrity protection and with no integrity protection. See below for more details.

Where the first node is a core network node, a flow indicator may be utilized to steer the data packet or message to a particular DRB, and/or to indicate whether integrity protection should be activated or not. The flow indicator may comprise a quality-of-service (QoS) indicator, such as 5QI (5G QoS indicator) or QCI (QoS class indicator). The flow indicator may take one of a plurality of values, including at least a first value indicative of integrity protection activation and a second value indicator of no integrity protection activation. The first value may be called SFI (sensitive flow indicator), while the second value may be called NFI (non-sensitive flow indicator) herein. The first DRB may be associated with SFI, while the second DRB may be associated with NFI.

Responsive to a determination that integrity protection is to be activated for a particular data packet or message, the first node adds or encapsulates meta/header data (e.g., backhaul meta/header data, such as N3 or S1 meta/header data)) using a flow identifier set to SFI, and forwards the encapsulated data packet in the first flow to the third node. Responsive to a determination that integrity protection is not to be activated for a particular data packet or message, the first node adds or encapsulates meta/header data (e.g., backhaul meta/header data) using a flow identifier set to NFI, and forwards the encapsulated data packet in the second flow to the third node.

Upon receipt of these data packets with the flow indicator values, the third node (e.g., a RAN node) is able to decapsulate the data packet and process the data packet for transmission over the associated DRB (and using the integrity protection configuration for that DRB). Further detail regarding this process is set out below with respect to FIG. 5.

Thus multiple flows are established, including at least one flow where integrity protection is applied, and at least one flow where integrity protection is not applied. Integrity protection is selectively activated in this embodiment by selectively forwarding the data packet on the appropriate flow/bearer.

Figure 4:
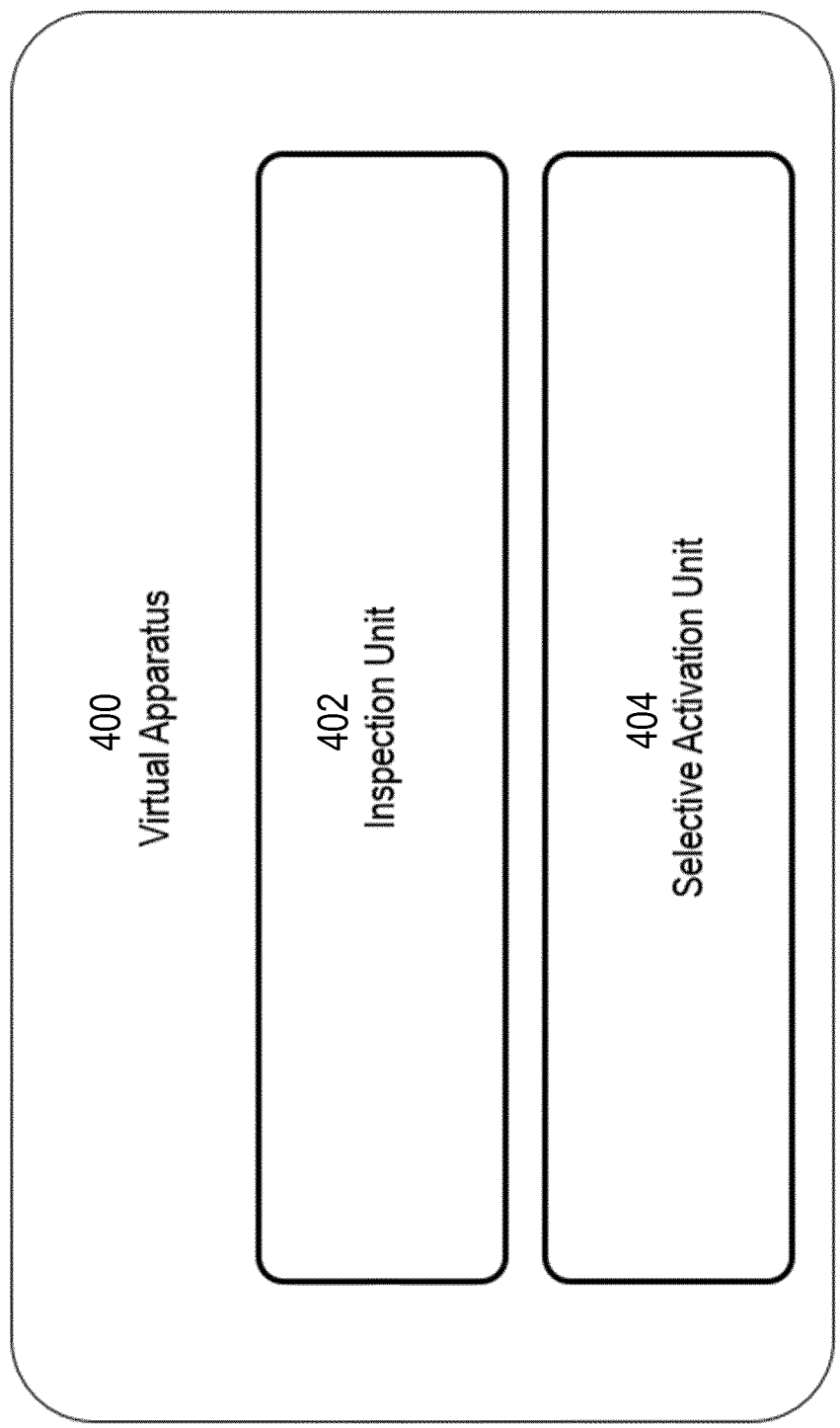
FIG. 4 is a schematic illustration of a virtualization apparatus according to embodiments of the disclosure.
Figure 13:
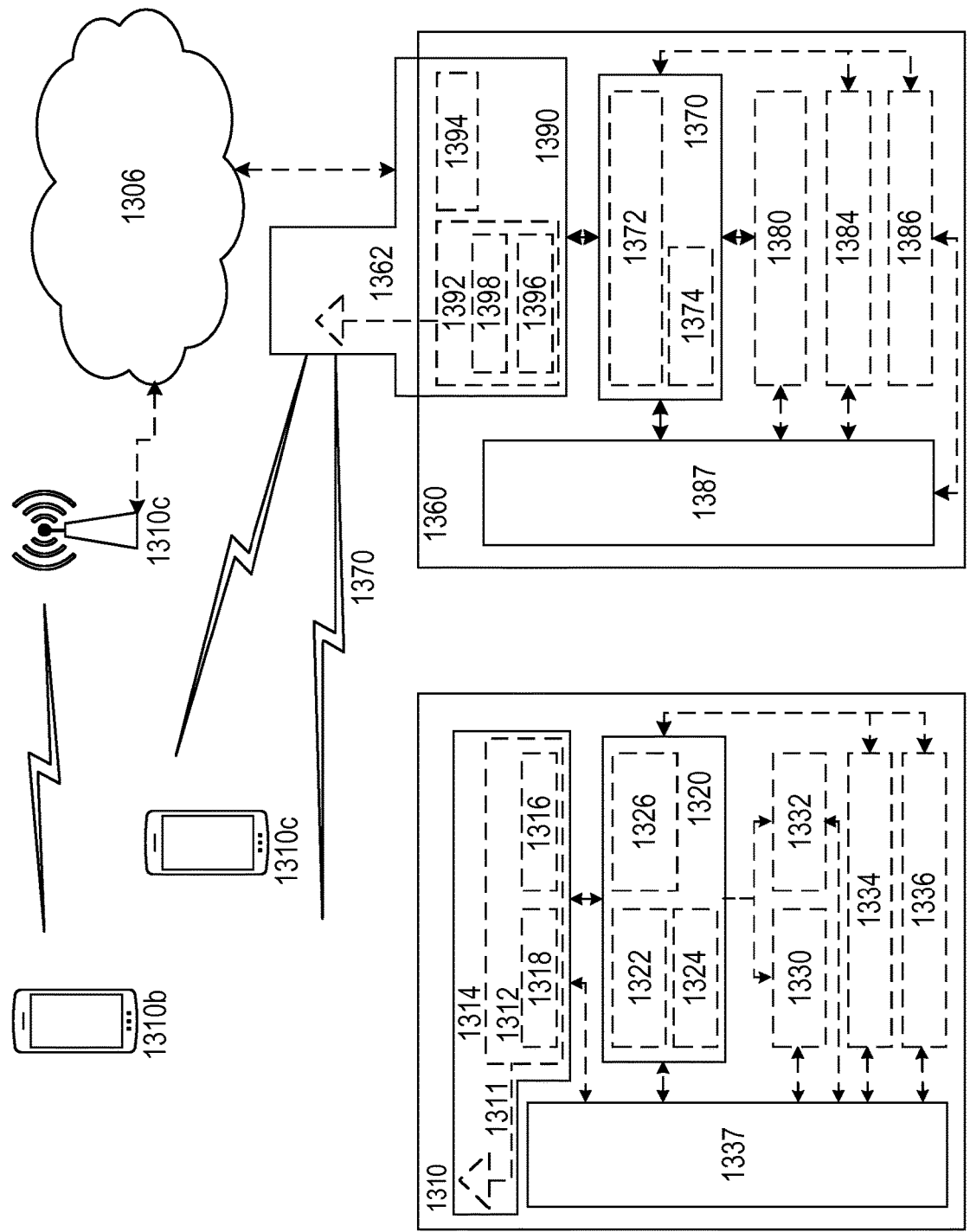
FIG. 13 shows a wireless network according to embodiments of the disclosure.

FIG. 4 illustrates a schematic block diagram of an apparatus 400 in a wireless network (for example, the wireless network shown in FIG. 13, or that shown in FIG. 2). The apparatus may be implemented in a wireless device or network node (e.g., wireless device 1310 or network node 1360 shown in FIG. 13, or the core network node (e.g. UPF, PGW, SGW), the radio access network node or the wireless device shown in FIG. 2). Apparatus 400 is operable to carry out the example method described with reference to FIG. 3 and possibly any other processes or methods disclosed herein. It is also to be understood that the method of FIG. 3 is not necessarily carried out solely by apparatus 400. At least some operations of the method can be performed by one or more other entities.

Virtual Apparatus 400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause inspection unit 402, selective activation unit 404, and any other suitable units of apparatus 400 to perform corresponding functions according to one or more embodiments of the present disclosure.

As illustrated in FIG. 4, apparatus 400 includes inspection unit 402 and selective activation unit 404. Inspection unit 402 is configured to inspect a data packet or message to determine a characteristic of the data packet or message. Selective activation unit 404 is configured to selectively activate integrity protection for onward transmission of the data packet or message to a second node of the wireless communications network based on the determined characteristic.

Figure 5:
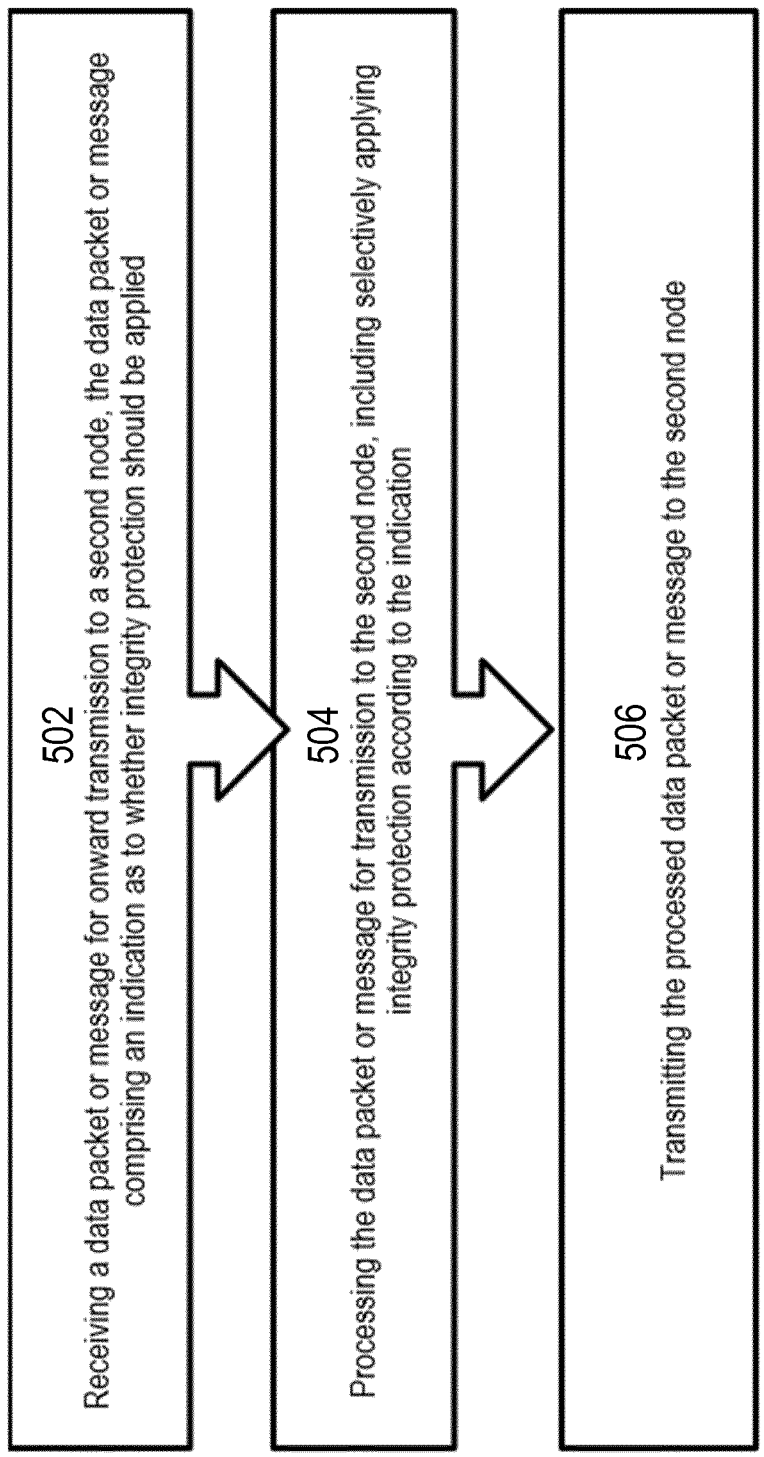
FIG. 5 is a flowchart of a method according to further embodiments of the disclosure.

FIG. 5 depicts a method in accordance with particular embodiments. The method may be implemented in a node of a wireless communication network, such as a radio access network node (e.g., base station, eNB, gNB). In the following description, the method is performed in a "third node" (e.g. a RAN node). The data packet or message is intended for wireless transmission to a "second node", which may be a wireless device (or UE) for downlink communication. The data packet or message is received from a third node, which may be a core network node (e.g., UPF, PGW/SGW, etc).

In one embodiment, the method is implemented within the packet data convergence protocol (PDCP) layer.

The method begins at step 502, in which the third node receives, from the first node, a data packet or message for onward transmission to the second node. The data packet or message comprises an indication as to whether integrity protection should be applied for onward transmission to the second node.

In step 504, the third node processes the data packet or message for transmission to the second node, including selectively applying integrity protection according to the indication. The processing may be that defined for PDCP in 3GPP TS 36.323 (e.g., v. 14.5.0).

In step 506, the third node transmits the processed data packet or message to the second node.

In one embodiment, a plurality of data radio bearers is established for wireless transmissions to the second node, including at least a first data radio bearer configured for the transmission of data with integrity protection, and a second data radio bearer configured for the transmission of data without integrity protection. In such an embodiment step 504 comprises processing the data packet or message for transmission on one of the plurality of data radio bearers according to the indication.

As noted above, the indication may comprise a flow indicator value appended to the data packet or message, having one of a plurality of values. The plurality of values comprises at least a first value (SFI) associated with the application of integrity protection to the data packet or message and a second value (NFI) associated with no application of integrity protection to the data packet or message. The flow indicator may comprise a QoS indicator such as 5QI or QCI, for example.

The flow indicator may be appended to the data packet or message in a header of the data packet or message. In such an embodiment, the third node decapsulates the data packet from its backhaul meta/header in step 502. In step 504, the third node optionally adds/encapsulates a new header (e.g., an SDAP header) with QFI set to the QFI used over the backhaul link, e.g., SFI or NFI. In step 506, the third node transmits the processed data packet or message on the DRB associated with the QFI.

Step 504 may comprise the step of calculating, when integrity protection is to be applied, a message authentication code (MAC-I) associated with integrity protection, and adding the MAC-I to the data packet or message. Note that, when integrity protection is not activated, a MAC-I may nonetheless be appended to the data packet or message, but set to some default or null value (such as all 0s, for example).

The second node thus receives a processed data packet or message and, when integrity protection is applied, is able to verify (e.g., based on the appended MAC-I) whether the data packet or message was sent by a known sender and not interfered or tampered with, or intercepted. If the data packet or message is verified, it can be forwarded on to upper layers for further processing. If not verified, the data packet or message may be discarded or ignored.

Figure 6:
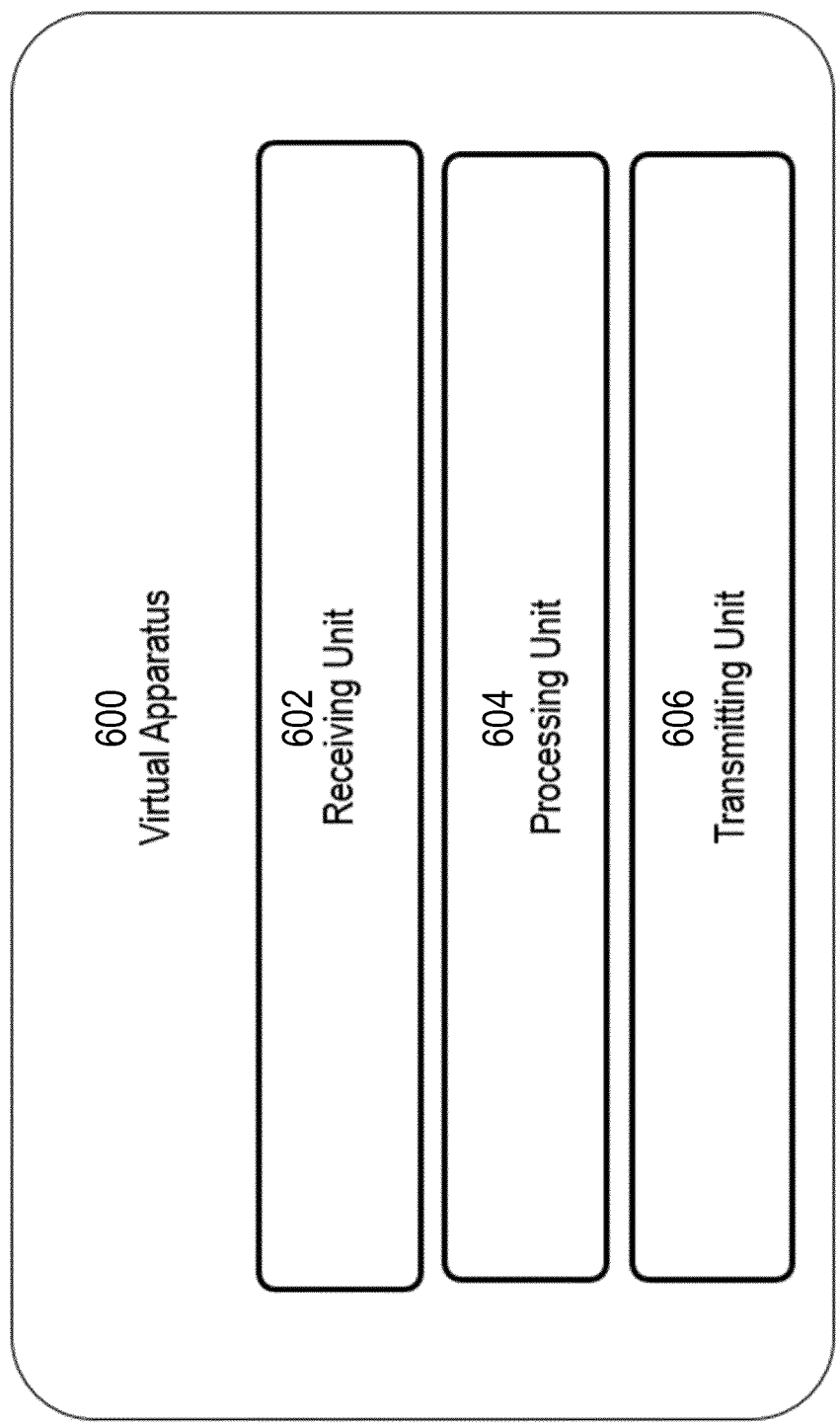
FIG. 6 is a schematic illustration of a virtualization apparatus according to further embodiments of the disclosure.

FIG. 6 illustrates a schematic block diagram of an apparatus 600 in a wireless network (for example, the wireless network shown in FIG. 13). The apparatus may be implemented in a wireless device or network node (e.g., wireless device 1310 or network node 1360 shown in FIG. 13). Apparatus 600 is operable to carry out the example method described with reference to FIG. 3 and possibly any other processes or methods disclosed herein. It is also to be understood that the method of FIG. 3 is not necessarily carried out solely by apparatus 600. At least some operations of the method can be performed by one or more other entities.

Virtual Apparatus 600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 602, processing unit 604, transmitting unit 606, and any other suitable units of apparatus 600 to perform corresponding functions according one or more embodiments of the present disclosure.

As illustrated in FIG. 6, apparatus 600 includes receiving unit 602, processing unit 604 and transmitting unit 606. Receiving unit 602 is configured to receive, from a first node of the wireless communications network, a data packet or message for onward transmission to a second node of the wireless communications network. The data packet or message comprises an indication as to whether integrity protection should be applied for onward transmission to the second node. The processing unit 604 is configured to process the data packet or message for transmission to the second node, including selectively applying integrity protection according to the indication. The transmitting unit 606 is configured to transmit the processed data packet or message to the second node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 7:
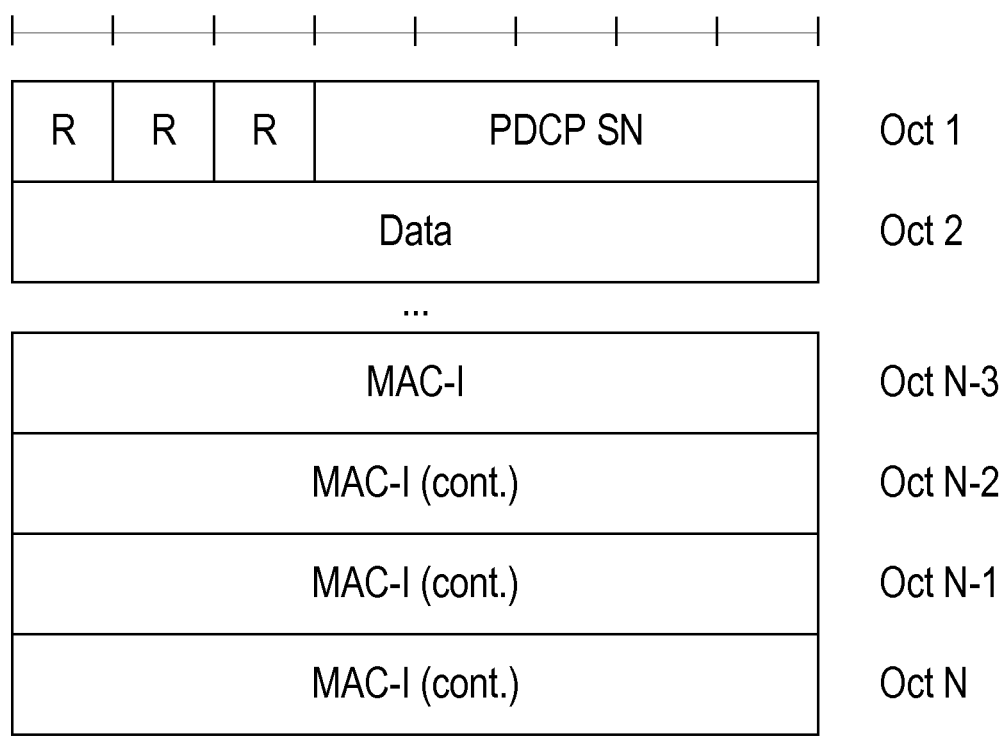
FIGS. 7-12 are schematic illustrations of a PDCP protocol data units or messages according to embodiments of the disclosure.
Figure 8:
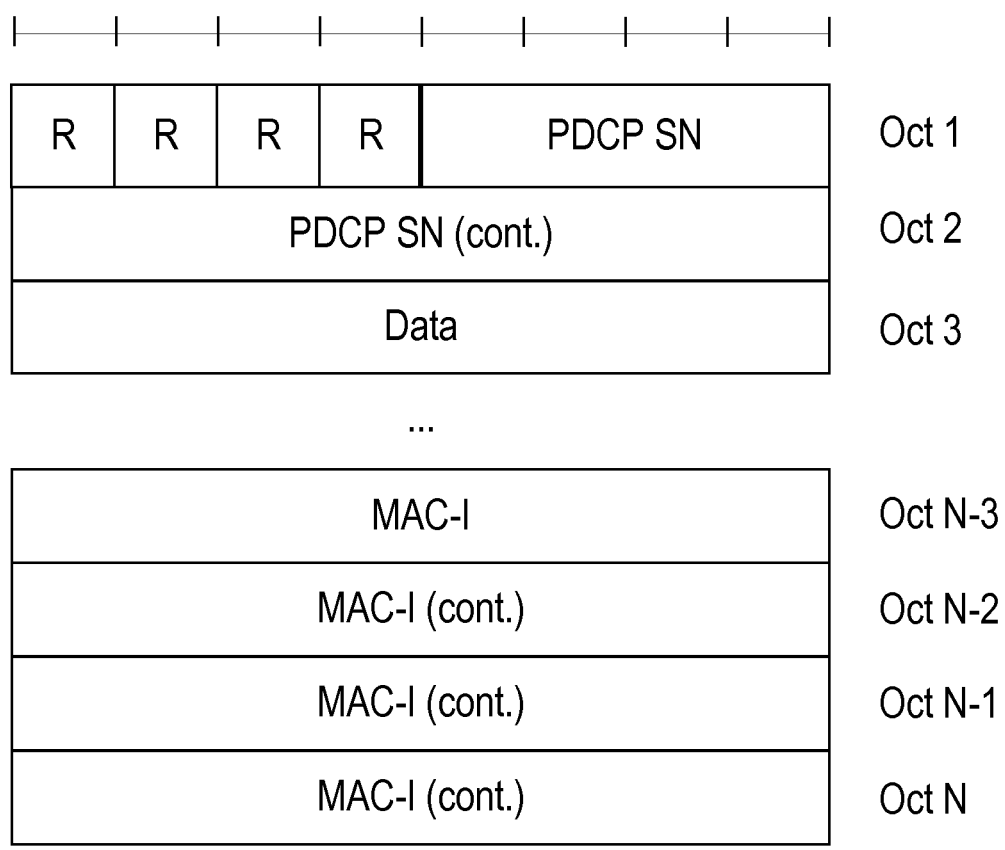
Figure 9:
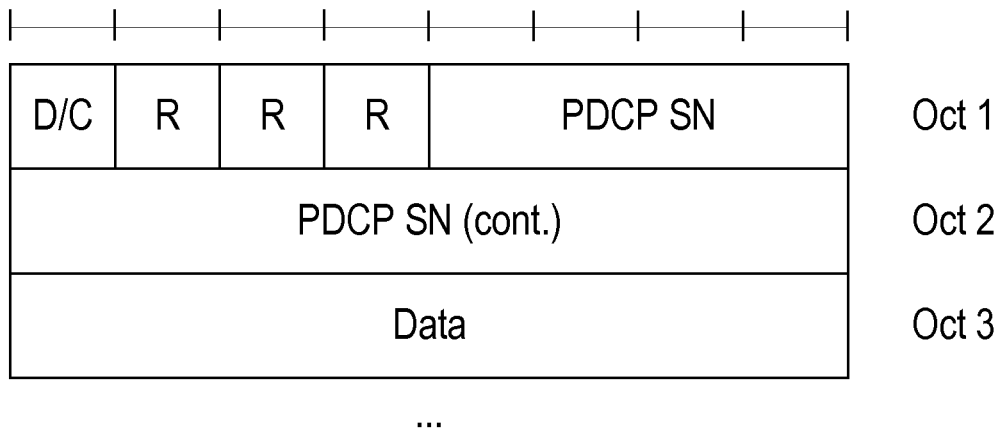
Figure 10:
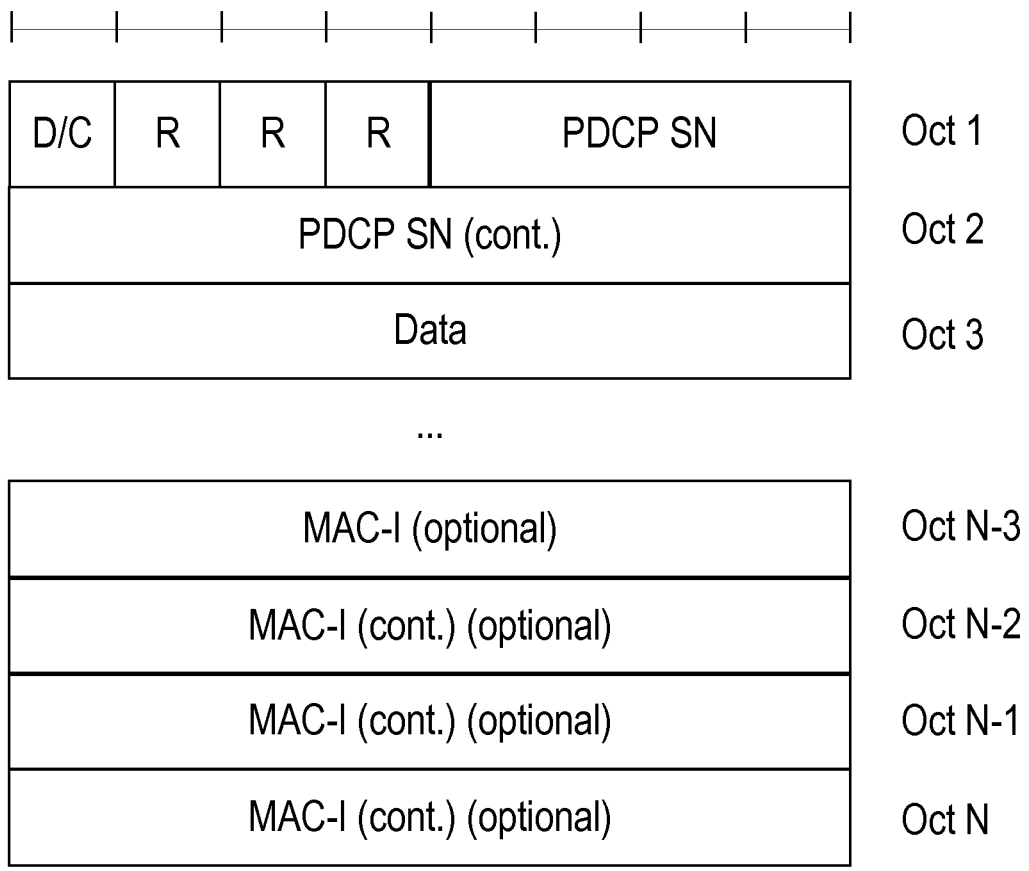
Figure 11:
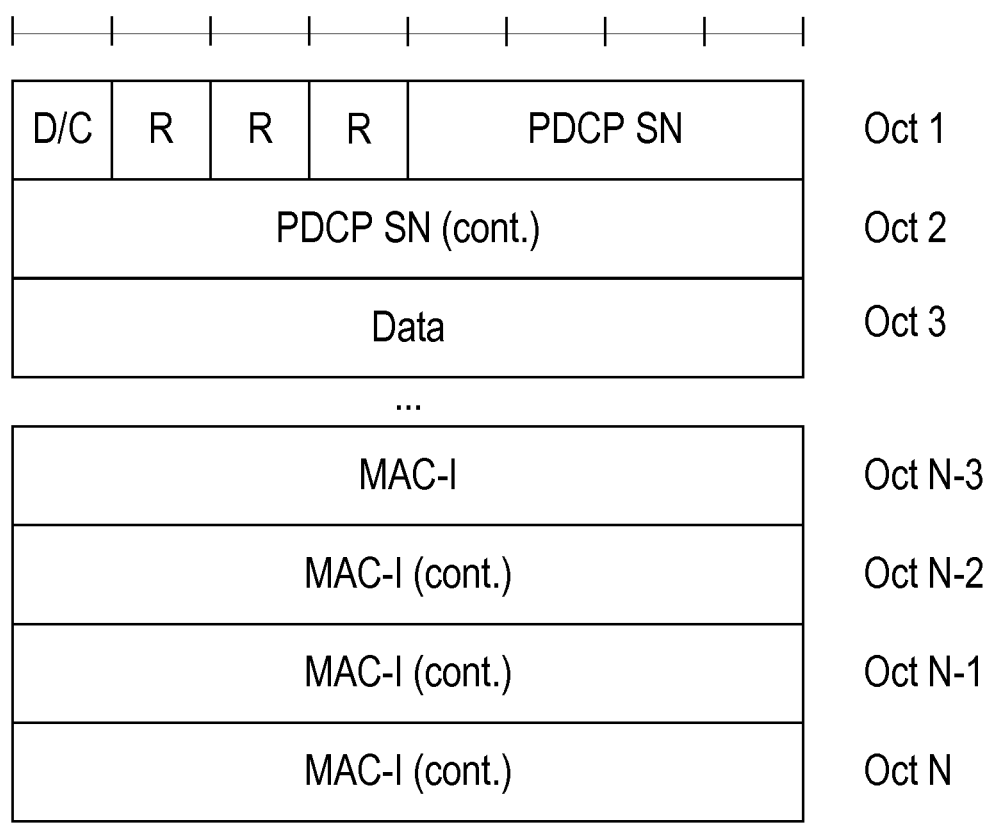
Figure 12:
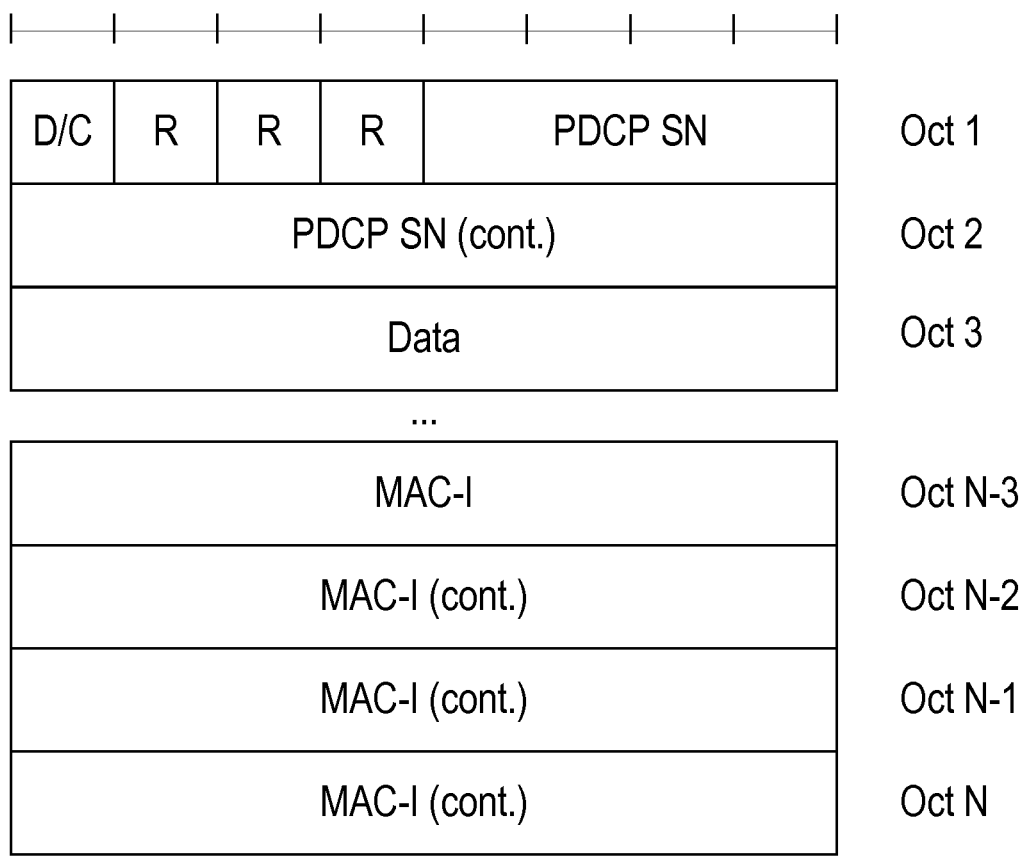

FIGS. 7 to 12 show some example formats for the processed data units or messages according to embodiments of the disclosure. FIG. 7 shows a PDCP data protocol data unit (PDU) for SRBs as used, for example, in LTE. FIG. 8 shows a PDCP data PDU format for SRBs used, for example, in NR. FIG. 9 shows a PDCP data PDU format for DRBs used, for example, in LTE. FIG. 10 shows a PDCP data PDU format for DRBs used, for example, in NR. FIG. 11 shows a PDCP data PDU format for relay node DRBs used, for example, in LTE. FIG. 12 shows a PDCP data PDU format for SLRBs used, for example, in LTE.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
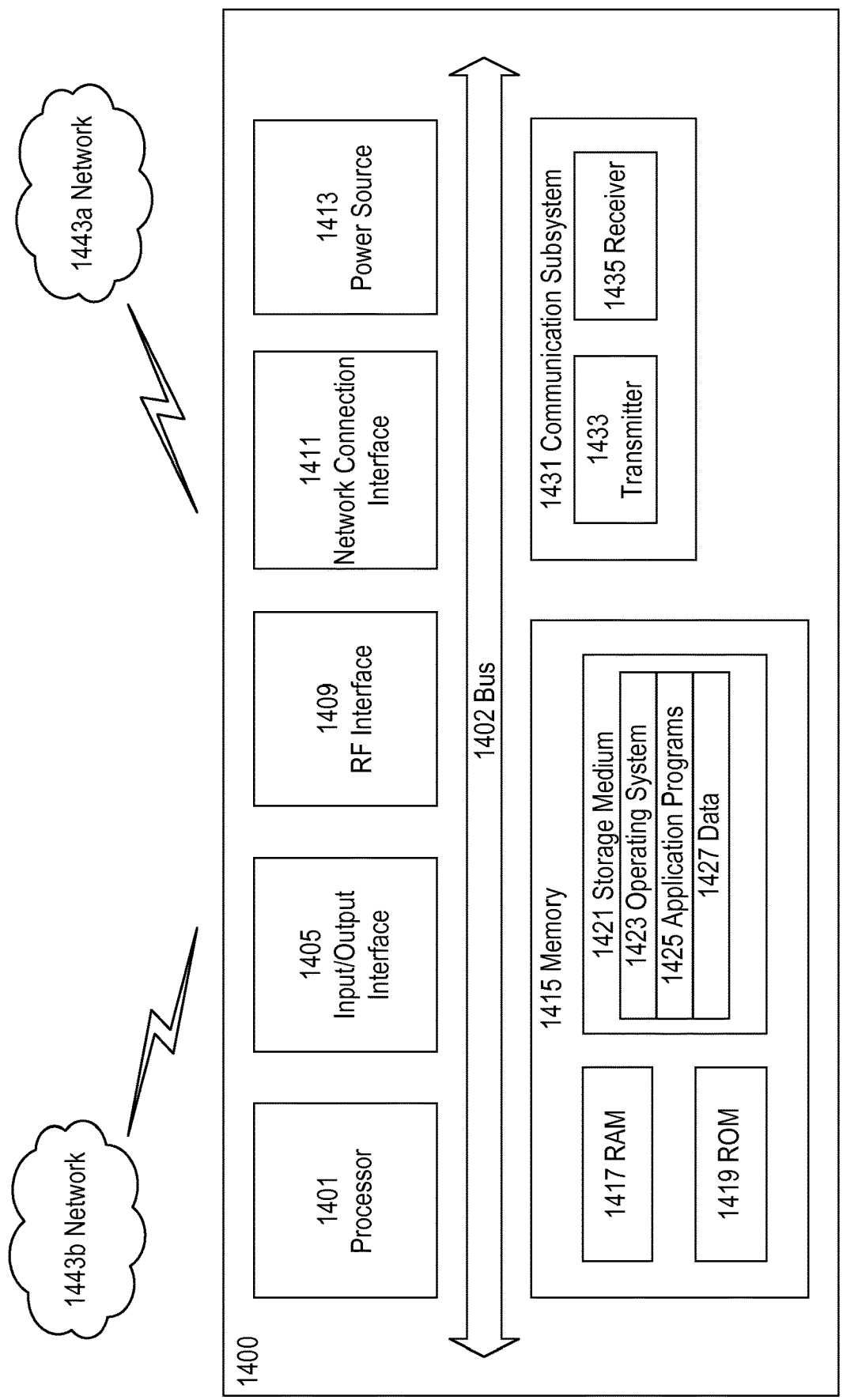
FIG. 14 shows a user equipment according to embodiments of the disclosure.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443a. Network 1443a may encompass wired and/or wireless networks such as a local-area network (LAN), a wide-area network (WAN), a computer network, a wireless network, a telecommunications network, another like network or any combination thereof. For example, network 1443a may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443b using communication subsystem 1431. Network 1443a and network 1443b may be the same network or networks or different network or networks. Communication subsystem 1431 may be configured to include one or more transceivers used to communicate with network 1443b. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443b may encompass wired and/or wireless networks such as a local-area network (LAN), a wide-area network (WAN), a computer network, a wireless network, a telecommunications network, another like network or any combination thereof. For example, network 1443b may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
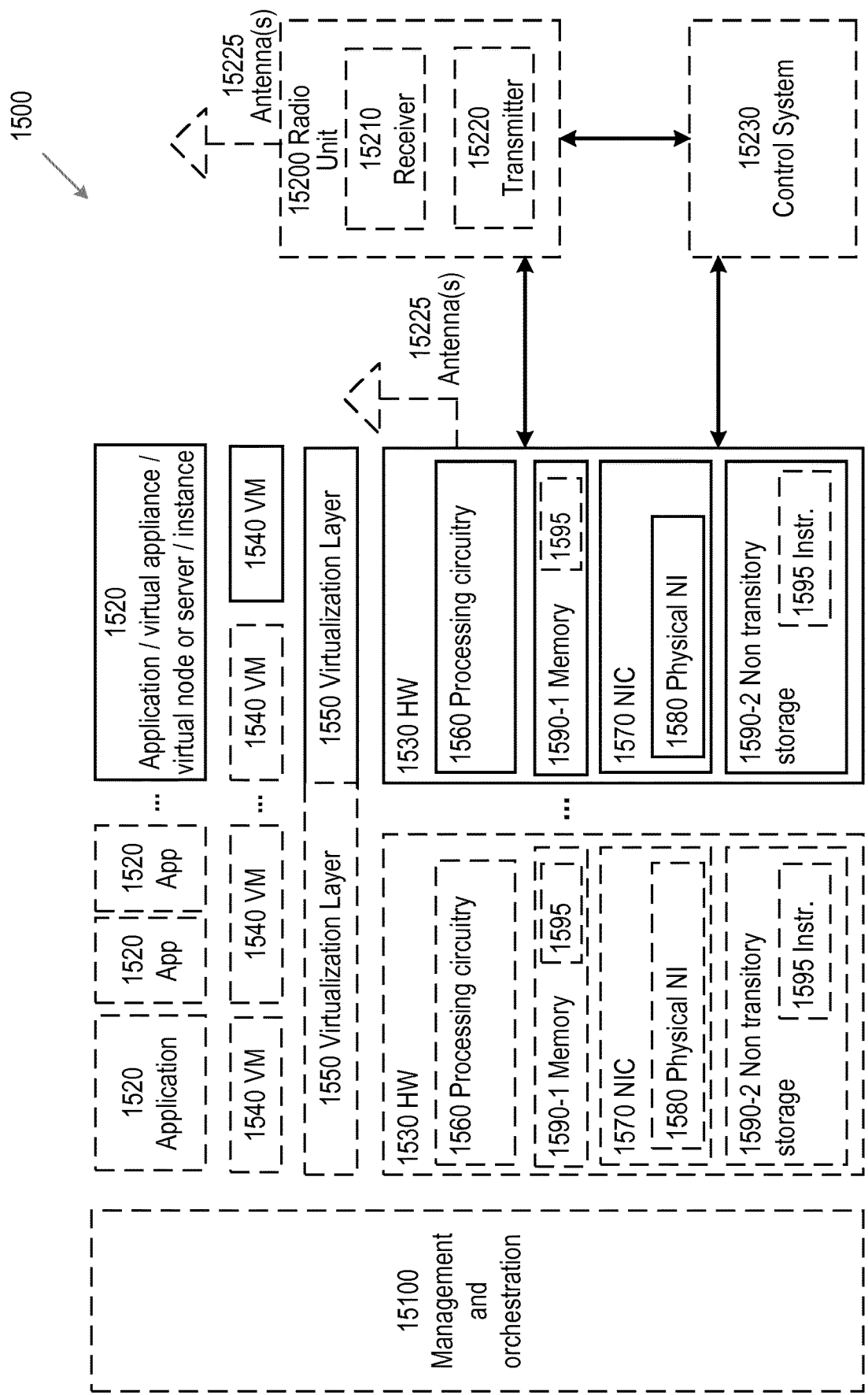
FIG. 15 shows a virtualization environment according to embodiments of the disclosure.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be effected with the use of control system 15230 which may alternatively be used for communication between the hardware nodes 1530 and radio units 15200.

Figure 16:
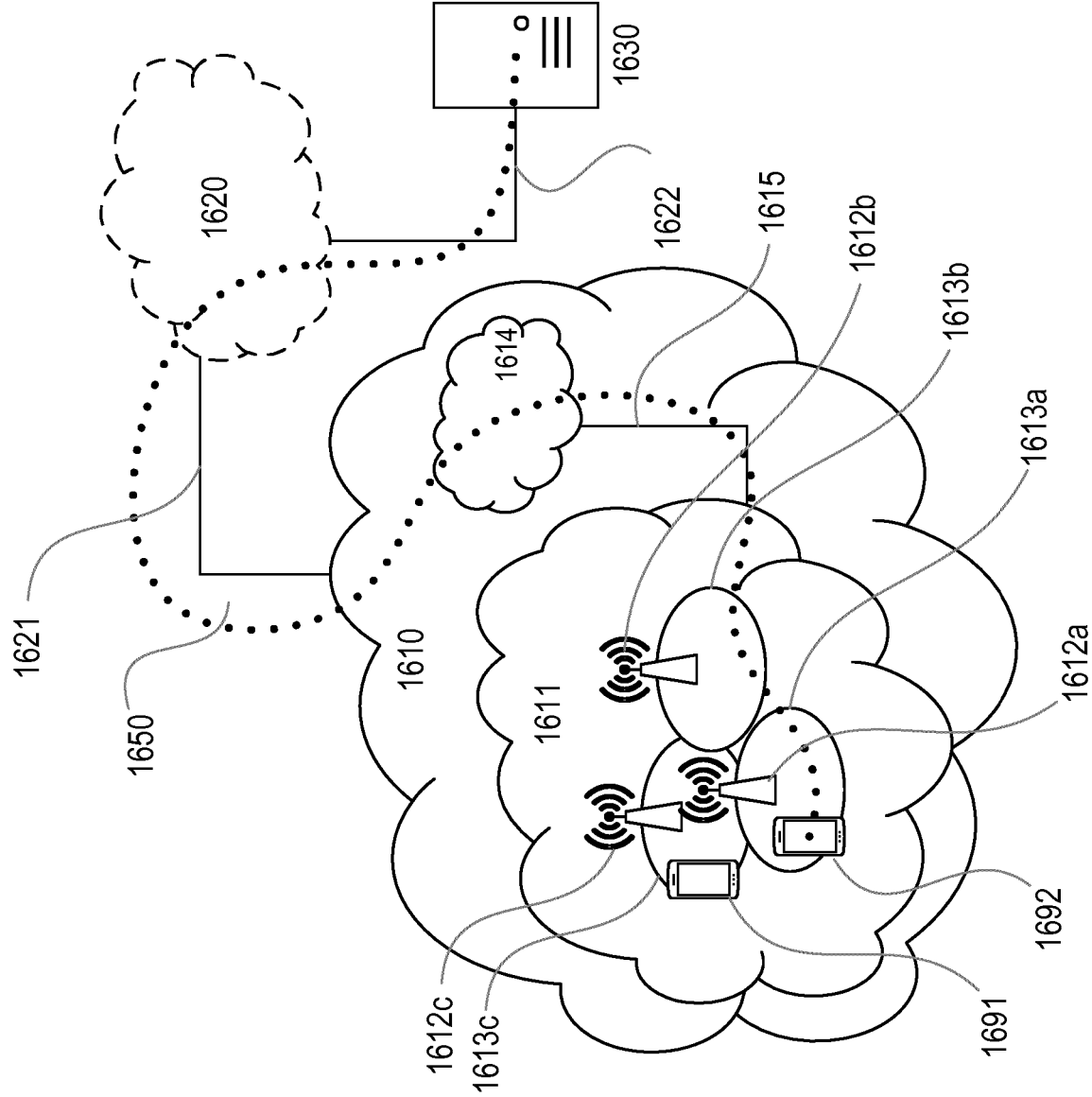
FIG. 16 shows a telecommunication network connected via an intermediate network to a host computer, according to embodiments of the disclosure.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

Figure 17:
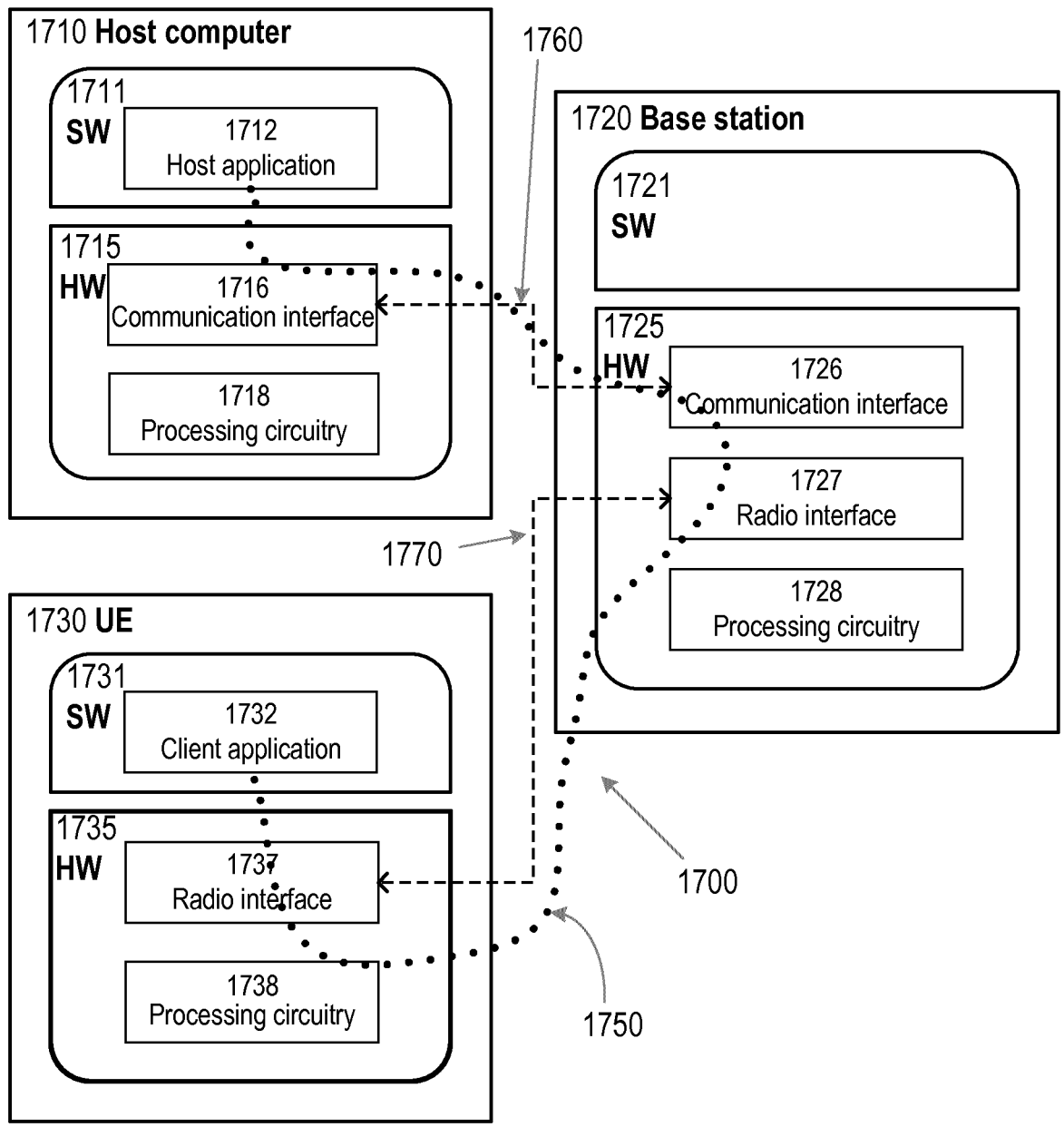
FIG. 17 shows a host computer communicating via a base station with a user equipment over a partially wireless connection, according to embodiments of the disclosure.

It is noted that host computer 1710, base station 1720 and UE 1730 illustrated in FIG. 17 may be similar or identical to host computer 1630, one of base stations 1612*a*, 1612*b*, 1612*c* and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the teachings of these embodiments may improve the security and thereby provide benefits such as greater security of user data and control data without unnecessarily increasing latency for services which do not require integrity protection.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
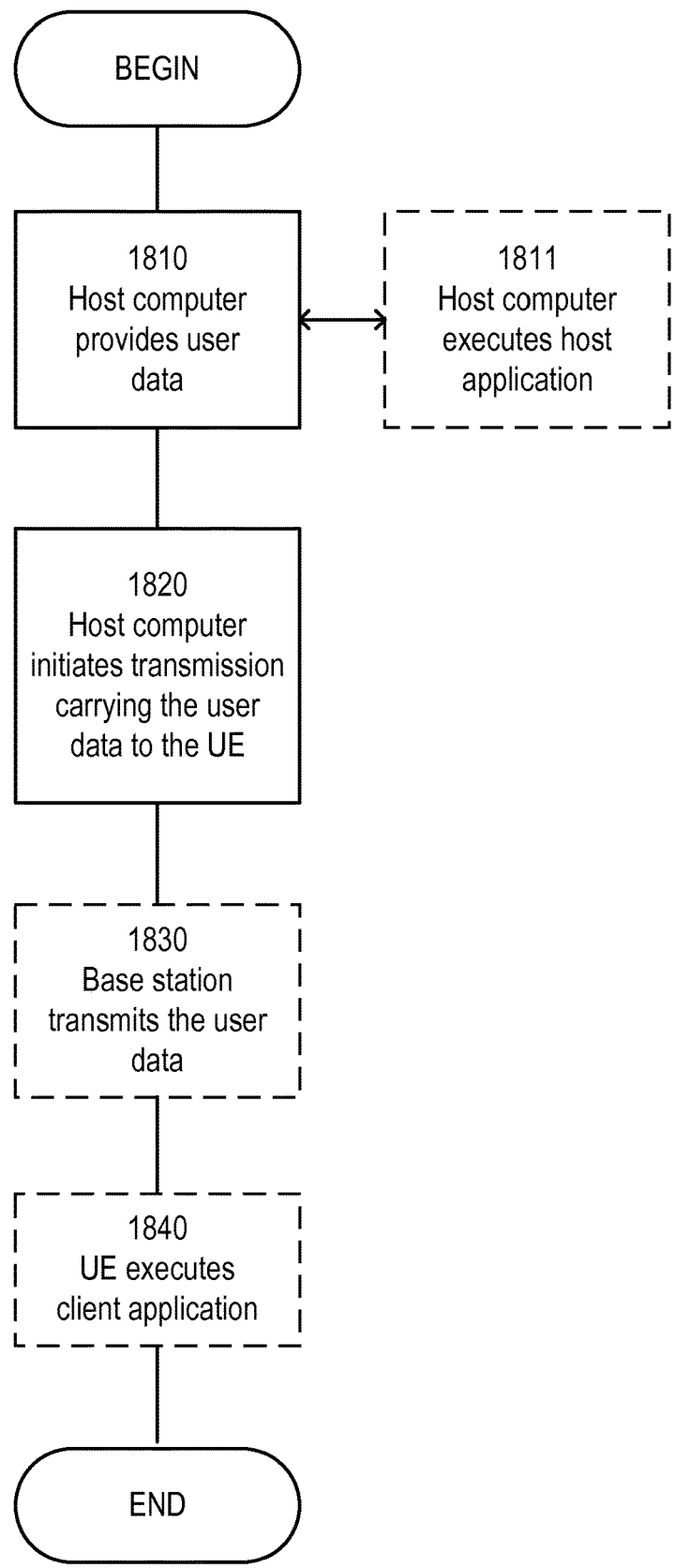
FIG. 18 is a flowchart depicting embodiments of a method in a communications system including a host computer, a base station and a user equipment, according to embodiments of the disclosure.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

Figure 19:
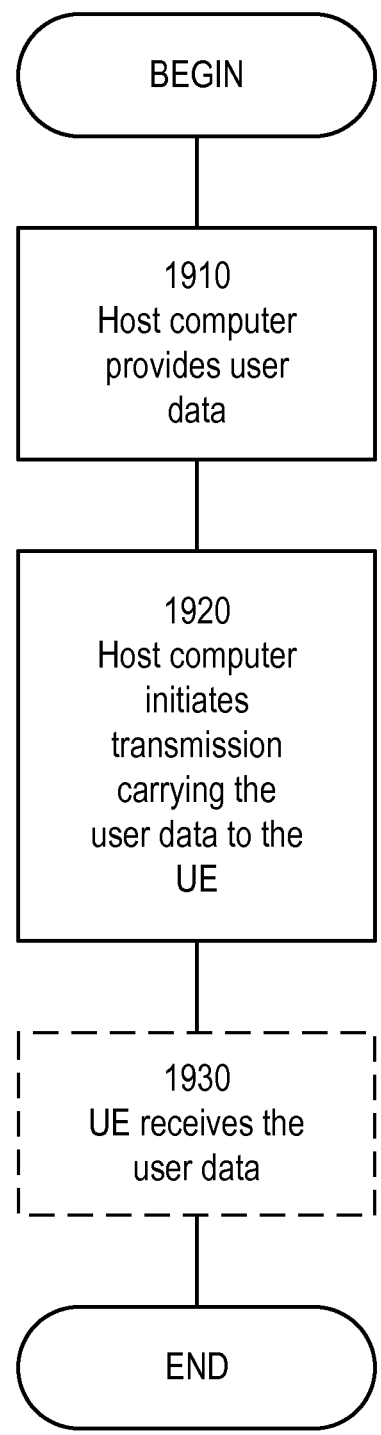
FIG. 19 is a flowchart depicting embodiments of a method in a communications system including a host computer, a base station and a user equipment, according to embodiments of the disclosure.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
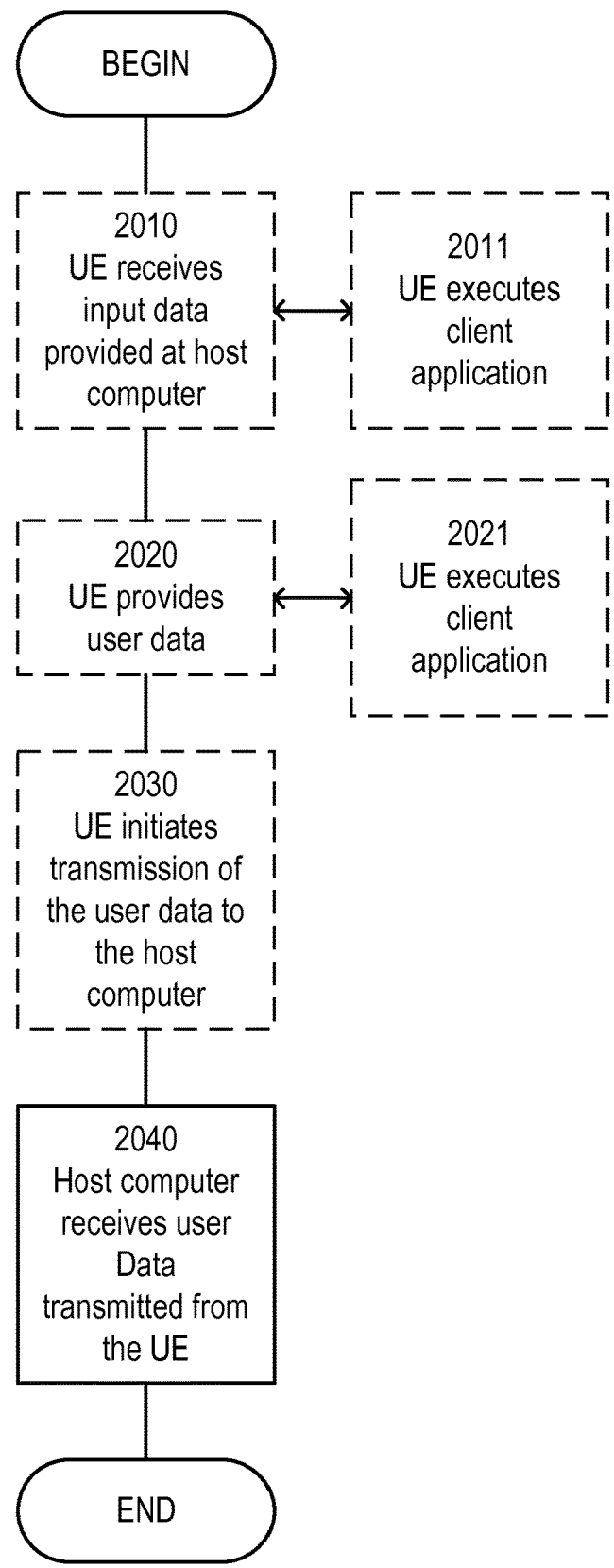
FIG. 20 is a flowchart depicting embodiments of a method in a communications system including a host computer, a base station and a user equipment, according to embodiments of the disclosure.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

Figure 21:
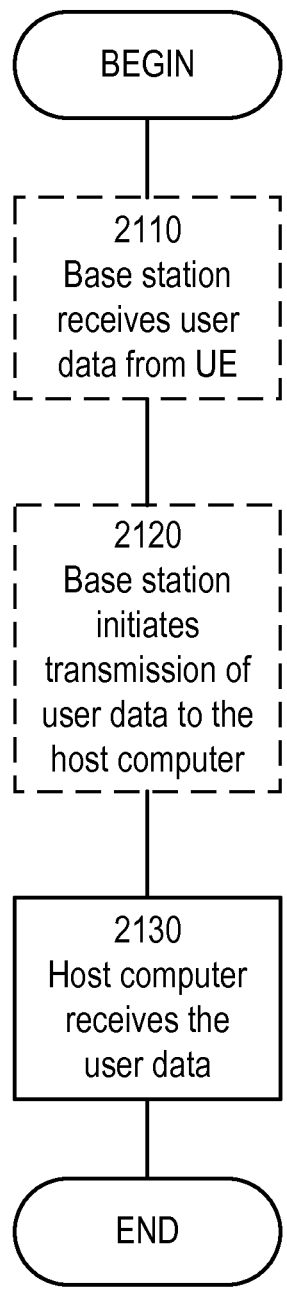
FIG. 21 is a flowchart depicting embodiments of a method in a communications system including a host computer, a base station and a user equipment, according to embodiments of the disclosure.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control/Message authentication code
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network The following statements set out embodiments of the disclosure.

Group A Embodiments

1. A method in a first node of a wireless communications network, the method comprising:
    inspecting a data packet or message to determine a characteristic of the data packet or message; and
    selectively activating integrity protection for onward transmission of the data packet or message to a second node of the wireless communications network based on the determined characteristic.

2. The method according to embodiment 1, wherein a plurality of data radio bearers are established for transmissions to the second node, the plurality of data radio bearers comprising a first data radio bearer being configured for the transmission of data with integrity protection, and a second data radio bearer being configured for the transmission of data without integrity protection, and
    wherein selectively activating integrity protection for onward transmission of the data packet or message to the second node comprises steering the data packet or message to one of the plurality of data radio bearers based on the determined characteristic.

3. The method according to embodiment 1 or 2, wherein selectively activating integrity protection for onward transmission of the data packet or message to the second node comprises applying a flow indicator value to the data packet or message, the flow indicator value having one of a plurality of values, the plurality of values comprising a first value associated with the application of integrity protection to the data packet or message and a second value associated with no application of integrity protection to the data packet or message.
4. The method according to embodiment 3, wherein the flow indicator comprises a quality-of-service indicator.
5. The method according to embodiment 3 or 4, wherein the flow indicator is appended to the data packet or message in a header.
6. The method according to any one of the preceding embodiments, wherein the first node comprises a core network node of the wireless communications network.
7. The method according to embodiment 6, wherein the first node comprises a user plane function, UPF, a packet data network gateway, PGW, or a serving gateway, SGW.
8. The method according to embodiment 6 or 7, wherein selectively activating integrity protection for onward transmission of the data packet or message to the second node comprises forwarding the data packet or message to a third node for onward wireless transmission to the second node.
9. The method according to embodiment 8, wherein the third node comprises a base station.
10. The method according to any one of embodiments 1 to 5, wherein the first node comprises a radio access network node of the wireless communications network.
11. The method according to embodiment 10, wherein the first node comprises a base station.
12. The method according to any one of the preceding embodiments, wherein the second node comprises a user equipment, UE.
13. The method according to any one of embodiments 1 to 5, wherein the first node comprises a user equipment, UE, and wherein the second node comprises a radio access network node of the wireless communications network.
14. The method according to any one of the preceding embodiments, wherein selectively activating integrity protection for onward transmission of the data packet or message comprises activating integrity protection for onward transmission of the data packet or message by default, and not activating integrity protection for onward transmission of the data packet or message responsive to a determination that the characteristic meets one or more exception criteria.
15. The method according to any one of embodiments 1 to 13, wherein selectively activating integrity protection for onward transmission of the data packet or message comprises not activating integrity protection for onward transmission of the data packet or message by default, and activating integrity protection for onward transmission of the data packet or message responsive to a determination that the characteristic meets one or more exception criteria.
16. The method according to any one of the preceding embodiments, wherein the characteristic of the data packet or message comprises a destination or source address associated with the data packet or message, and wherein selectively activating integrity protection for onward transmission of the data packet or message comprises activating integrity protection for onward transmission of the data packet or message responsive to a determination that the destination or source address is associated with one or more first services, and not activating integrity protection for onward transmission of the data packet or message responsive to a determination that the destination or source address is associated with one or more second services.
17. The method according to embodiment 16, wherein the one or more first services comprises one or more of: banking services and services for which data has not been subjected to one or more cryptographic protocols.
18. The method according to any one of the preceding embodiments, wherein the characteristic of the data packet or message comprises the presence or absence of a cryptographic security protocol applied to the data packet or message, and wherein selectively activating integrity protection for onward transmission of the data packet or message comprises activating integrity protection for onward transmission of the data packet or message responsive to a determination that a cryptographic security protocol has not been applied to the data packet or message, and not activating integrity protection for onward transmission of the data packet or message responsive to a determination that a cryptographic security protocol has been applied to the data packet or message.
19. The method according to any one of the preceding embodiments, wherein the characteristic of the data packet or message comprises the size of the data packet or message, and wherein selectively activating integrity protection for onward transmission of the data packet or message comprises activating integrity protection for onward transmission of the data packet or message responsive to a determination that the size is less than one or more thresholds, and not activating integrity protection for onward transmission of the data packet or message responsive to a determination that the size is greater than one or more thresholds.
20. The method according to any one of the preceding embodiments, wherein selectively activating integrity protection for onward transmission of the data packet or message to the second node comprises applying one or more functions to the determined characteristic to selectively activate integrity protection for onward transmission of the data packet or message.
21. The method according to embodiment 20, wherein the one or more functions selectively activate integrity protection for onward transmission of the data packet or message to the second node according to the level of user sensitivity associated with the data packet or message.
22. The method according to embodiment 21, wherein the one or more functions selectively activate integrity protection for onward transmission of the data packet or message to the second node according to the level of user sensitivity to interception by a third party associated with the data packet or message.
23. The method according to any one of embodiments 20 to 22, further comprising receiving at least one of the one or more functions from a fourth node of the wireless communications network.
24. The method according to embodiment 23, wherein the fourth node is one or more of a policy control function, PCF, or a policy and charging rules function, PCRF.
25. The method according to any one of the preceding embodiments, wherein the data packet or message comprises a user plane data packet or message.

26. The method according to any one of embodiments 1 to 24, wherein the data packet or message comprises a control plane message.
27. The method of any of the previous embodiments, further comprising:
providing user data; and
forwarding the user data to a host computer via the transmission to the second node.

Group B Embodiments

28. A method in a third node of a wireless communications network, the method comprising:
receiving, from a first node of the wireless communications network, a data packet or message for onward transmission to a second node of the wireless communications network, the data packet or message comprising an indication as to whether integrity protection should be applied for onward transmission to the second node;
processing the data packet or message for transmission to the second node, including selectively applying integrity protection according to the indication; and
transmitting the processed data packet or message to the second node.
29. The method according to embodiment 28, wherein a plurality of data radio bearers are established for transmissions to the second node, the plurality of data radio bearers comprising a first data radio bearer being configured for the transmission of data with integrity protection, and a second data radio bearer being configured for the transmission of data without integrity protection, and
wherein processing the data packet or message for transmission to the second node comprises processing the data packet or message for transmission on one of the plurality of data radio bearers according to the indication.
30. The method according to embodiment 28 or 29, wherein the indication comprises a flow indicator value appended to the data packet or message, the flow indicator value having one of a plurality of values, the plurality of values comprising a first value associated with the application of integrity protection to the data packet or message and a second value associated with no application of integrity protection to the data packet or message.
31. The method according to embodiment 30, wherein the flow indicator comprises a quality-of-service indicator.
32. The method according to embodiment 30 or 31, wherein the flow indicator is appended to the data packet or message in a header.
33. The method according to any one of embodiments 28 to 32, wherein the first node comprises a core network node of the wireless communications network.
34. The method according to embodiment 33, wherein the first node comprises a user plane function, UPF, a packet data network gateway, PGW, or a serving gateway, SGW.
35. The method according to any one of embodiments 28 to 34, wherein the third node comprises a base station.
36. The method according to any one of embodiments 28 to 35, wherein the second node comprises a user equipment, UE.
37. The method according to any one of embodiments 28 to 36, wherein the data packet or message comprises a user plane data packet or message.
38. The method according to any one of embodiments 28 to 36, wherein the data packet or message comprises a control plane message.
39. The method of any of the previous embodiments, further comprising:
obtaining user data; and
forwarding the user data to a wireless device.

Group C Embodiments

40. A wireless device, the wireless device comprising:
processing circuitry configured to perform any of the steps of any of the Group A embodiments; and
power supply circuitry configured to supply power to the wireless device.
41. A base station, the base station comprising:
processing circuitry configured to perform any of the steps of any of the Group A or Group B embodiments;
power supply circuitry configured to supply power to the base station.
42. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
43. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group A or Group B embodiments.
44. The communication system of the previous embodiment further including the base station.
45. The communication system of the previous 2 embodiments, further including the UE, wherein the UE is configured to communicate with the base station.
46. The communication system of the previous 3 embodiments, wherein:
the processing circuitry of the host computer is configured to execute a host application, thereby providing the user data; and
the UE comprises processing circuitry configured to execute a client application associated with the host application.

47. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group A or Group B embodiments.
48. The method of the previous embodiment, further comprising, at the base station, transmitting the user data.
49. The method of the previous 2 embodiments, wherein the user data is provided at the host computer by executing a host application, the method further comprising, at the UE, executing a client application associated with the host application.
50. A user equipment (UE) configured to communicate with a base station, the UE comprising a radio interface and processing circuitry configured to performs the of the previous 3 embodiments.
51. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.
52. The communication system of the previous embodiment, wherein the cellular network further includes a base station configured to communicate with the UE.
53. The communication system of the previous 2 embodiments, wherein:
   the processing circuitry of the host computer is configured to execute a host application, thereby providing the user data; and
   the UE's processing circuitry is configured to execute a client application associated with the host application.
54. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.
55. The method of the previous embodiment, further comprising at the UE, receiving the user data from the base station.
56. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.
57. The communication system of the previous embodiment, further including the UE.
58. The communication system of the previous 2 embodiments, further including the base station, wherein the base station comprises a radio interface configured to communicate with the UE and a communication interface configured to forward to the host computer the user data carried by a transmission from the UE to the base station.
59. The communication system of the previous 3 embodiments, wherein:
   the processing circuitry of the host computer is configured to execute a host application; and
   the UE's processing circuitry is configured to execute a client application associated with the host application, thereby providing the user data.
60. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.
61. A method implemented in a communication system including a host computer, a base station and a user equipment (UE), the method comprising:
   at the host computer, receiving user data transmitted to the base station from the UE, wherein the UE performs any of the steps of any of the Group A embodiments.
62. The method of the previous embodiment, further comprising, at the UE, providing the user data to the base station.
63. The method of the previous 2 embodiments, further comprising:
   at the UE, executing a client application, thereby providing the user data to be transmitted; and
   at the host computer, executing a host application associated with the client application.
64. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
65. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A or Group B embodiments.
66. The communication system of the previous embodiment further including the base station.
67. The communication system of the previous 2 embodiments, further including the UE, wherein the UE is configured to communicate with the base station.
68. The communication system of the previous 3 embodiments, wherein:
   the processing circuitry of the host computer is configured to execute a host application;

the UE is configured to execute a client application associated with the host application, thereby providing the user data to be received by the host computer.
69. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.
70. The method of the previous embodiment, further comprising at the base station, receiving the user data from the UE.
71. The method of the previous 2 embodiments, further comprising at the base station, initiating a transmission of the received user data to the host computer.
72. A network node, the network node comprising:
processing circuitry configured to perform any of the steps of any of the Group A embodiments;
power supply circuitry configured to supply power to the base station.
73. The network node of the previous embodiment, wherein the network node is a core network node.

The invention claimed is:

1. A method in a first node of a wireless communications network, the method comprising:
inspecting a data packet or message to determine a characteristic of the data packet or message, the characteristic of the data packet or message comprising the following associated with the data packet or message: a destination address, a source address, and a size; and
selectively activating integrity protection for onward transmission of the data packet or message to a second node of the wireless communications network based on the determined characteristic, selectively activating integrity protection for onward transmission of the data packet or message comprising:
activating integrity protection for onward transmission of the data packet or message responsive to a determination of the following:
the destination is associated with one or more first services,
the source address is associated with the one or more first services, and
the size is less than one or more thresholds; and
refraining from activating integrity protection for onward transmission of the data packet or message responsive to a determination of the following:
the destination address is associated with one or more second services;
the source address is associated with the one or more second services; and
the size is greater than the one or more thresholds.

2. The method according to claim 1, wherein:
a plurality of data radio bearers are established for transmissions to the second node, the plurality of data radio bearers comprising a first data radio bearer configured for the transmission of data with integrity protection, and a second data radio bearer configured for the transmission of data without integrity protection; and
selectively activating integrity protection for onward transmission of the data packet or message to the second node comprises steering the data packet or message to one of the plurality of data radio bearers based on the determined characteristic.

3. The method according to claim 1, wherein:
selectively activating integrity protection for onward transmission of the data packet or message to the second node comprises applying a flow indicator value to the data packet or message; and
the flow indicator value has one of a plurality of values including a first value associated with the application of integrity protection to the data packet or message and a second value associated with no application of integrity protection to the data packet or message.

4. The method according to claim 3, wherein the flow indicator comprises a quality-of-service indicator.

5. The method according to claim 1, wherein:
the first node comprises a core network node of the wireless communications network; and
selectively activating integrity protection for onward transmission of the data packet or message to the second node comprises forwarding the data packet or message to a third node for onward wireless transmission to the second node.

6. The method according to claim 1, wherein:
the first node comprises a radio access network node of the wireless communications network; and
the second node comprises a user equipment (UE).

7. The method according to claim 1, wherein:
the first node comprises a user equipment (UE); and
the second node comprises a radio access network node of the wireless communications network.

8. The method according to claim 1, wherein selectively activating integrity protection for onward transmission of the data packet or message comprises:
activating integrity protection for onward transmission of the data packet or message by default; and
refraining from activating integrity protection for onward transmission of the data packet or message responsive to a determination that the characteristic meets one or more exception criteria.

9. The method according to claim 1, wherein selectively activating integrity protection for onward transmission of the data packet or message comprises:
refraining from activating integrity protection for onward transmission of the data packet or message by default; and
activating integrity protection for onward transmission of the data packet or message responsive to a determination that the characteristic meets one or more exception criteria.

10. The method according to claim 1, wherein:
the characteristic of the data packet or message comprises the presence or absence of a cryptographic security protocol applied to the data packet or message; and
selectively activating integrity protection for onward transmission of the data packet or message comprises:
activating integrity protection for onward transmission of the data packet or message responsive to a determination that a cryptographic security protocol has not been applied to the data packet or message; and
refraining from activating integrity protection for onward transmission of the data packet or message responsive to a determination that a cryptographic security protocol has been applied to the data packet or message.

11. The method according to claim 1, wherein:
selectively activating integrity protection for onward transmission of the data packet or message to the second node comprises applying one or more functions to the determined characteristic to selectively activate integrity protection for onward transmission of the data packet or message; and the method further comprises receiving at least one of the one or more functions from a fourth node of the wireless communications network.

12. A node in a wireless communication network, the node comprising:
power supply circuitry configured to supply power to the node; and
processing circuitry configured to:
inspect a data packet or message to determine a characteristic of the data packet or message, the characteristic of the data packet or message comprising the following associated with the data packet or message: a destination address, a source address, and a size; and
selectively activate integrity protection for onward transmission of the data packet or message to a second node of the wireless communications network based on the determined characteristic, selectively activating integrity protection for onward transmission of the data packet or message based on:
activating integrity protection for onward transmission of the data packet or message responsive to a determination of the following:
the destination is associated with one or more first services, the source address is associated with the one or more first services, and
the size is less than one or more thresholds; and
refraining from activating integrity protection for onward transmission of the data packet or message responsive to a determination of the following:
the destination address is associated with one or more second services;
the source address is associated with the one or more second services; and
the size is greater than the one or more thresholds.

13. The node according to claim 12, wherein:
a plurality of data radio bearers is established for transmissions to the second node, the plurality of data radio bearers comprising a first data radio bearer being configured for the transmission of data with integrity protection, and a second data radio bearer being configured for the transmission of data without integrity protection; and
the processing circuitry is configured to selectively activate integrity protection for onward transmission of the data packet or message to the second node by steering the data packet or message to one of the plurality of data radio bearers based on the determined characteristic.

14. The node according to claim 12, wherein:
the processing circuitry is configured to selectively activate integrity protection for onward transmission of the data packet or message to the second node by applying a flow indicator value to the data packet or message; and
the flow indicator value has one of a plurality of values including a first value associated with the application of integrity protection to the data packet or message and a second value associated with no application of integrity protection to the data packet or message.

15. The node according to claim 14, wherein the flow indicator comprises a quality-of-service indicator.

16. The node according to claim 12, wherein:
the node is a core network node of the wireless communications network; and
the processing circuitry is configured to selectively activate integrity protection for onward transmission of the data packet or message to the second node by forwarding the data packet or message to a third node for onward wireless transmission to the second node.

17. The node according to claim 12, wherein:
the node is a radio access network node of the wireless communications network; and
the second node comprises a user equipment (UE).

18. The node according to claim 12, wherein:
the node is a user equipment (UE); and
the second node comprises a radio access network node of the wireless communications network.

19. The node according to claim 12, wherein the processing circuitry is configured to selectively activate integrity protection for onward transmission of the data packet or message based on:
activating integrity protection for onward transmission of the data packet or message by default; and
refraining from activating integrity protection for onward transmission of the data packet or message responsive to a determination that the characteristic meets one or more exception criteria.

20. The node according to claim 12, wherein the processing circuitry is configured to selectively activate integrity protection for onward transmission of the data packet or message based on:
refraining from activating integrity protection for onward transmission of the data packet or message by default; and
activating integrity protection for onward transmission of the data packet or message responsive to a determination that the characteristic meets one or more exception criteria.

21. The node according to claim 12, wherein:
the characteristic of the data packet or message comprises the presence or absence of a cryptographic security protocol applied to the data packet or message; and
the processing circuitry is configured to selectively activate integrity protection for onward transmission of the data packet or message based on:
activating integrity protection for onward transmission of the data packet or message responsive to a determination that a cryptographic security protocol has not been applied to the data packet or message, and
refraining from activating integrity protection for onward transmission of the data packet or message responsive to a determination that a cryptographic security protocol has been applied to the data packet or message.

22. The node according to claim 12, wherein the processing circuitry is configured to:
selectively activate integrity protection for onward transmission of the data packet or message to the second node by applying one or more functions to the determined characteristic to selectively activate integrity protection for onward transmission of the data packet or message; and
receive at least one of the one or more functions from a fourth node of the wireless communications network.

* * * * *